(12) United States Patent
Yoshikawa et al.

(10) Patent No.: US 6,646,807 B2
(45) Date of Patent: Nov. 11, 2003

(54) LENS ARRAY UNIT AND PROCESS FOR MAKING LENS ARRAY

(75) Inventors: Yasuhiro Yoshikawa, Kyoto (JP); Motoshi Uehara, Kyoto (JP); Tsutomu Hasegawa, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 10/177,307

(22) Filed: Jun. 19, 2002

(65) Prior Publication Data
US 2003/0021034 A1 Jan. 30, 2003

(30) Foreign Application Priority Data
Jun. 19, 2001 (JP) .................................. 2001-184816
Jun. 19, 2001 (JP) .................................. 2001-184817

(51) Int. Cl.[7] ............................................. G02B 27/10
(52) U.S. Cl. .................... 359/619; 359/621; 359/622
(58) Field of Search ........................... 359/619, 621, 359/622, 626

(56) References Cited
U.S. PATENT DOCUMENTS
6,124,974 A * 9/2000 Burger ........................ 359/621
6,381,072 B1 * 4/2002 Burger ........................ 359/622
6,449,099 B2 * 9/2002 Fujimoto et al. ............ 359/621
6,545,811 B1 * 4/2003 Fujimoto ..................... 359/619

FOREIGN PATENT DOCUMENTS
JP 2001-264513 9/2001
JP 2001-352429 12/2001

* cited by examiner

*Primary Examiner*—Loha Ben
(74) *Attorney, Agent, or Firm*—Merchant & Gould P.C.

(57) ABSTRACT

The present invention relates to a lens array unit fabrication process. A lens array forming step produces a first and a second lens arrays each having linearly-arranged first or second lenses. In a lens array connecting step, the first array is connected to the second array so that the first lenses are axially aligned with the second lenses. The connecting step includes providing of ultrasonic vibration by e.g. an ultrasonic horn. In the forming step, a resin casting is used in which lens array regions, each including linearly-arranged first or second lenses, are integrally formed in a direction perpendicular to the rows of lenses. In the forming step, a multiple-blade rotary cutter, provided with rotary blades disposed at a pitch corresponding to the transverse dimension of each lens array region, is used to simultaneously make cuts flanking the lens array regions.

33 Claims, 17 Drawing Sheets

LENS ARRAY UNIT AND PROCESS FOR MAKING LENS ARRAY

BACKGROUND OF THE INVENTION

1. Field of the Invention

The present invention relates to a lens array unit and a process for making a lens array. A lens array or a lens array unit is incorporated in an optical apparatus such as an image reading apparatus for converging light from an object (e.g. document) to form an image of the object at a predetermined position (e.g. on a light receiving element).

2. Description of the Related Art

In an image reading apparatus such as a facsimile machine or a scanner, a plurality of light receiving elements arranged in a line are utilized to read an image of an object in a non-inverted, non-magnified manner. In this case, image forming means need be provided between the document and the plurality of light receiving elements to form an actual size erect image of the object on the plurality of light receiving elements. The image forming means may be a lens array unit. A lens array unit consists of a plurality of lens arrays stacked on each other, where each array has two opposite surfaces in which a plurality of convex lens faces are integrally formed (See FIGS. 1 and 2).

The lens array unit may be made by cutting out several lens arrays from a resin casting provided with lens array-forming regions (see FIG. 5) and then connecting two lens arrays, for example.

For cutting out lens arrays from a resin casting, use may be made of a laser beam cutting method or ultrasonic vibration cutting method. However, when the resin casting is formed of PMMA for example, laser beams will simply pass through the resin casting, thereby making no cuts in the resin casting. With the ultrasonic vibration cutting method, on the other hand, the cut portion will melt or become soft as in a case where thermal energy is applied to the resin casting. This may leads to problems that the cut surface cannot be made a mirror surface, and that cut burrs may be left on the cut surface. In such adverse circumstances, dust may adhere to the cut surface, the burrs, or even onto the lens face. It is probable that the burr itself may adhere to the lens face in assembling the lens array or incorporating the lens array in an image reading apparatus. In this situation, the optical performance of the lens unit will deteriorate.

As an alternative method, use may be made of a rotary cutter designed for cutting lens arrays one by one out of the resin casting. However, this one-cutter method provides poor work efficiency. Another problem is caused when the rotary cutter is about to make a second cut in the resin casting after a first cut has been made. Specifically, while the second cut is being made, the rotary cutter gives pressure to the lens array region, thereby causing the region to warp into the space of the first cut. In this situation, the resultant cut surface fails to be straight and cannot be made a mirror surface. Unfavorably, this may deteriorate the optical performance of the lens array.

Turning now to a method of assembling lens arrays, a first lens array may be formed with projections, while a second lens array may be formed with recesses into which the projections of the first lens array are fitted. To secure the attachment, adhesive may be applied to the engaging portions.

However, when there is a large dimensional error in the projections or holes mentioned above, the projections fail to be properly fitted into the holes. In this situation, the connected lens arrays fail to be parallel to each other, or the lenses of the respective arrays are unaligned, or the distance between the connected lens arrays is unduly greater or smaller than the design value.

These problems may occur in using adhesive for the projections and the holes, unless the amount of the adhesive is suitably controlled. When too much adhesive is applied, the adhesive may be pressed out of the engaging holes and flow onto a nearby lens. Unfavorably this causes the optical properties of the lens to vary. In particular, when the adhesive is the so-called instantaneous type, the lens properties may be significantly changed due to the whitening of the hardening adhesive.

SUMMARY OF THE INVENTION

It is an object of the present invention to provide a technique enabling easy manufacture of a lens array and lens array unit having a good optical performance.

According to a first aspect of the present invention, there is provide a process for making a lens array unit. In a lens array forming step, a first lens array including a plurality of first lenses arranged in a line and a second lens array including a plurality of second lenses arranged in a line are formed. In a lens array connecting step, the first lens array is connected to the second lens array so that a lens axis of each of the first lenses is aligned with a lens axis of a corresponding one of the second lenses. The lens array connecting step includes supplying of ultrasonic vibration.

Preferably, one of the first and the second lens arrays is provided with a male part whereas the other of the lens arrays is provided with a female part. In the lens array connecting step, the male part is incompletely or provisionally fitted into the female part to provide a provisional assembly, and ultrasonic vibration is supplied to the provisional assembly for melting an obverse surface of the male part and/or an inner surface of the female part so as to completely fit the male part into the female part.

The obverse surface of the male part or the inner surface of the female part may be provided with a projection for concentrating ultrasonic energy in supplying the ultrasonic vibration.

The lens array unit may further comprise a light-shielding member formed with a plurality of through-holes, where each of the through-holes is positioned in facing relation to a corresponding one of the first lenses. In the lens array connecting step, it is preferable that the light-shielding member is connected to the first lens array utilizing the ultrasonic vibration supplied for ultrasonically welding the first lens array to the second lens array.

Preferably, the light-shielding member may be different in material from the first lens array.

Preferably, one of the first lens array and the second lens array may be provided with a stopper for engaging the other lens array when the male part is fitted into the female part.

The male part may include a first taper surface and the female part may include a second taper surface for engaging the first taper surface when the male part is provisionally fitted into the female part.

Preferably, measurements are made in advance with respect to variation of a distance between the first lens array and the second lens array after the ultrasonic vibration supply is started, and the ultrasonic vibration supply is stopped in the measured period of time during which the above-mentioned distance is constant.

The ultrasonic vibration may be supplied with an ultrasonic horn, arranged to generate longitudinal vibration. The horn is pressed against an ultrasonic supply surface of the provisional assembly. The ultrasonic vibration supplied to the ultrasonic supply surface may have a frequency of 10–30 kHz and a total energy of 20–40 J.

The lens array forming step may be performed by cutting the first lens array or the second lens array out of a resin casting formed with a plurality of lens array regions. Each of the lens array regions is formed with a plurality of first lenses or second lenses arranged in a line, and the plurality of lens array regions are aligned with each other in a direction transverse to the line of the first lenses or the second lenses.

In cutting out the first lens array or the second lens array, use may be made of a multiple-blade rotary cutter including a plurality of rotary blades regularly spaced from each other at a pitch corresponding to a dimension of each of the lens array regions in the transverse direction. With the use of the cutter, slits are formed simultaneously at sides of the lens array regions.

The forming of the slits may include a first step of cutting the resin casting from a first surface of the resin-mold article with a plurality of first rotary blades to form a plurality of first grooves extending to an intermediate point of a thickness of the resin casting, and a second step performed after the first step for cutting the resin casting from a second surface opposite the first surface with a plurality of second rotary blades which are thicker than the first rotary blades to form a plurality of second grooves connected to the first grooves to provide the slits.

Preferably, the first and the second steps may be performed to satisfy the inequalities of $$t1 > t/2,\ t2 > (t-t1),\ t2 < t/2$$

where t1 is a depth of each of the first grooves before the second step is performed, t2 is a depth of each of the second grooves and t is a thickness of the resin casting at the sides of the plurality of lens array regions.

For example, the lens array unit may serve as image forming means in an optical apparatus for converging light traveling from an object for forming an image of the object at a predetermined position.

According to a second aspect of the present invention, there is provided a process for making a lens array unit comprising a lens array forming step for forming a lens array including a plurality of lenses arranged in a line, and a light-shielding member connecting step for connecting a light-shielding member formed with a plurality of through-holes arranged in a line to the lens array so that each of the through-holes is positioned in facing relationship to a corresponding one of the lenses. The light-shielding member connecting step includes supplying of ultrasonic vibration.

Preferably, one of the lens array and the light-shielding member may be provided with a male part whereas the other one may be provided with a female part. In the light-shielding member connecting step, the male part is provisionally fitted into the female part to provide a provisional assembly, and the ultrasonic vibration is supplied to the provisional assembly for melting and softening at least one of an obverse surface of the male part and an inner surface of the female part for completely fitting the male part into the female part. Preferably, measurement is performed in advance with respect to variation of a distance between the lens array and the light-shielding member after the ultrasonic vibration supply is started, and the ultrasonic vibration supply is stopped in the measured period of time during which the above-mentioned distance is constant.

Preferably, the male part may include a first taper surface and the female part may include a second taper surface for engaging the first taper surface when the male part is provisionally fitted into the female part.

Preferably, the light-shielding member may be different in material from the lens array. The ultrasonic vibration may be supplied from an ultrasonic horn, capable of supplying longitudinal vibration. The horn is pressed against an ultrasonic supply surface of the provisional assembly. The ultrasonic vibration supplied to the ultrasonic supply surface may have a frequency of 10–30 kHz and a total energy of 20–40 J.

According to a third aspect of the present invention, there is provided a process for making a lens array unit comprising a lens array forming step for forming a first lens array including a plurality of first lenses arranged in a line and a second lens array including a plurality of second lenses arranged in a line. The process also comprises a lens array connecting step for connecting the first lens array to the second lens array so that a lens axis of each of the first lenses is aligned with a lens axis of a corresponding one of the second lenses. The lens array forming step includes cutting the first lens array or the second lens array out of a resin casting formed with a plurality of lens array regions. Each of the lens array regions is formed with a plurality of first lenses or second lenses arranged in a line, and the plurality of lens array regions are aligned with each other in a direction transverse to the line of the first lenses or the second lenses. In the cutting of the first lens array or the second lens array, slits are formed simultaneously at sides of the lens array regions using a multiple-blade rotary cutter including a plurality of rotary blades regularly spaced from each other at a pitch corresponding to a dimension of each of the lens array regions in the transverse direction.

The forming of the slits includes a first step of cutting the resin casting from a first surface of the resin casting with a plurality of first rotary blades to form a plurality of first grooves extending to an intermediate point of a thickness of the resin casting, and a second step performed after the first step for cutting the resin casting from a second surface opposite the first surface with a plurality of second rotary blades which are thicker than the first rotary blades to form a plurality of second grooves connected to the first grooves to provide the slits. Preferably, the first and the second steps are performed to satisfy the inequalities of $$t1 > t/2,\ t2 > (t-t1),\ t2 < t/2$$

where t1 is a depth of each of the first grooves before the second step is performed, t2 is a depth of each of the second grooves and t is a thickness of the resin casting at the sides of the plurality of lens array regions.

For example, the resin casting includes a plurality of first lens array regions and the same number of second lens array regions. Each of the first lens array regions later becomes a first lens array while each of the second lens array regions later becomes a second lens array. In the lens array forming step, plural pairs of a first lens array and a second lens array are obtained from one resin casting. Preferably, in the lens array connecting step, the first lens array is connected to the second lens array simultaneously with respect to the plural pairs.

According to a second aspect of the present invention, there is provided a process for making a lens array comprising the steps of: preparing a resin casting integrally formed with a plurality of lens array regions each of which includes a plurality of lenses arranged in a line, the plurality of lens array regions being aligned with each other in a direction transverse to the line of the plurality of lenses; and forming slits simultaneously at sides of the lens array regions using a multiple-blade rotary cutter including a plurality of rotary blades regularly spaced from each other at a pitch corresponding to a dimension of each of the lens array regions in the transverse direction.

Preferably, the step of forming slits may be performed while cooling the resin casting. The cooling of the resin casting may be performed by supplying cooling water to a contact area between the multiple-blade rotary cutter and the resin casting and to an area adjacent to the contact area.

The forming of the slits may includes a first step of cutting the resin casting from a first surface of the resin casting with a plurality of first rotary blades to form a plurality of first grooves extending to an intermediate point of a thickness of the resin casting, and a second step performed after the first step for cutting the resin casting from a second surface opposite the first surface with a plurality of second rotary blades which are thicker than the first rotary blades to form a plurality of second grooves connected to the first grooves to provide the slits. Preferably, the first and the second steps may be performed to satisfy the inequalities of $t1 > t/2, t2 > (t-t1), t2 < t/2$ where t1 is a depth of each of the first grooves before the second step is performed, t2 is a depth of each of the second grooves and t is a thickness of the resin casting at the sides of the plurality of lens array regions.

For example, the resin casting may be 0.8–2.0 mm in thickness, the multiple-blade rotary cutter may be moved at a velocity of 500–2,000 mm/min, and each of the rotary blades is driven at a rotation speed of 2,000–6,000 rpm.

Each of the rotary blades may be 50–150 mm in diameter and has sawteeth the number of which is from 100 to 200.

According to a fifth aspect of the present invention, there is provided a process for making a lens array comprising the steps of: preparing a resin casting integrally formed with a plurality of lens array regions each of which includes a plurality of lenses arranged in a line, the plurality of lens array regions being aligned with each other in a direction transverse to the line of the plurality of lenses; and forming slits at sides of the lens array regions. The forming of the slits includes a first step of cutting the resin casting from a first surface of the resin-mold article with a plurality of first rotary blades to form a plurality of first grooves extending to an intermediate point of a thickness of the resin casting, and a second step performed after the first step for cutting the resin casting from a second surface opposite the first surface with a plurality of second rotary blades which are thicker than the first rotary blades to form a plurality of second grooves connected to the first grooves to provide the slits. Preferably, the first and the second steps may be performed to satisfy the inequalities of $t1 > t/2, t2 > (t-t1), t2 < t/2$ where t1 is a depth of each of the first grooves before the second step is performed, t2 is a depth of each of the second grooves and t is a thickness of the resin casting at the sides of the plurality of lens array regions.

BRIEF DESCRIPTION OF THE DRAWINGS

FIG. 3A is a sectional view taken along lines X1—X1 of FIG. 2, whereas

FIG. 6A is a sectional view taken along lines X3—X3 of FIG. 5, whereas

FIG. 14A is a sectional view taken along lines X1—X1 of FIG. 2 showing the provisional assembly before ultrasonic welding, whereas

FIG. 15A is a sectional view taken along lines X1—X1 of FIG. 2 showing the provisional assembly in ultrasonic welding, whereas

DETAILED DESCRIPTION OF THE PREFERRED EMBODIMENTS

Figure 1:
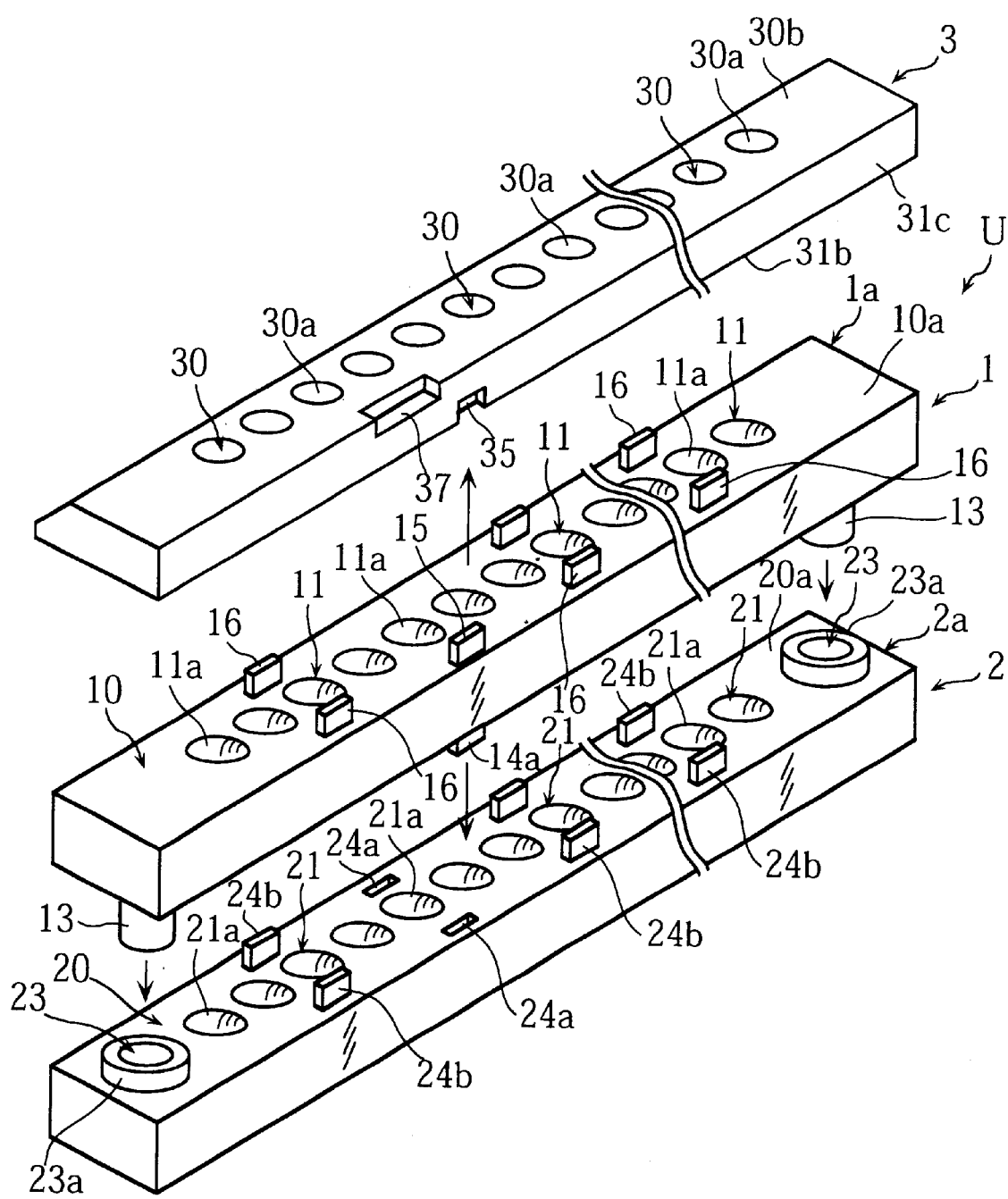
FIG. 1 is an exploded perspective view illustrating an example of lens array unit obtained by a manufacturing process according to the present invention.
Figure 2:
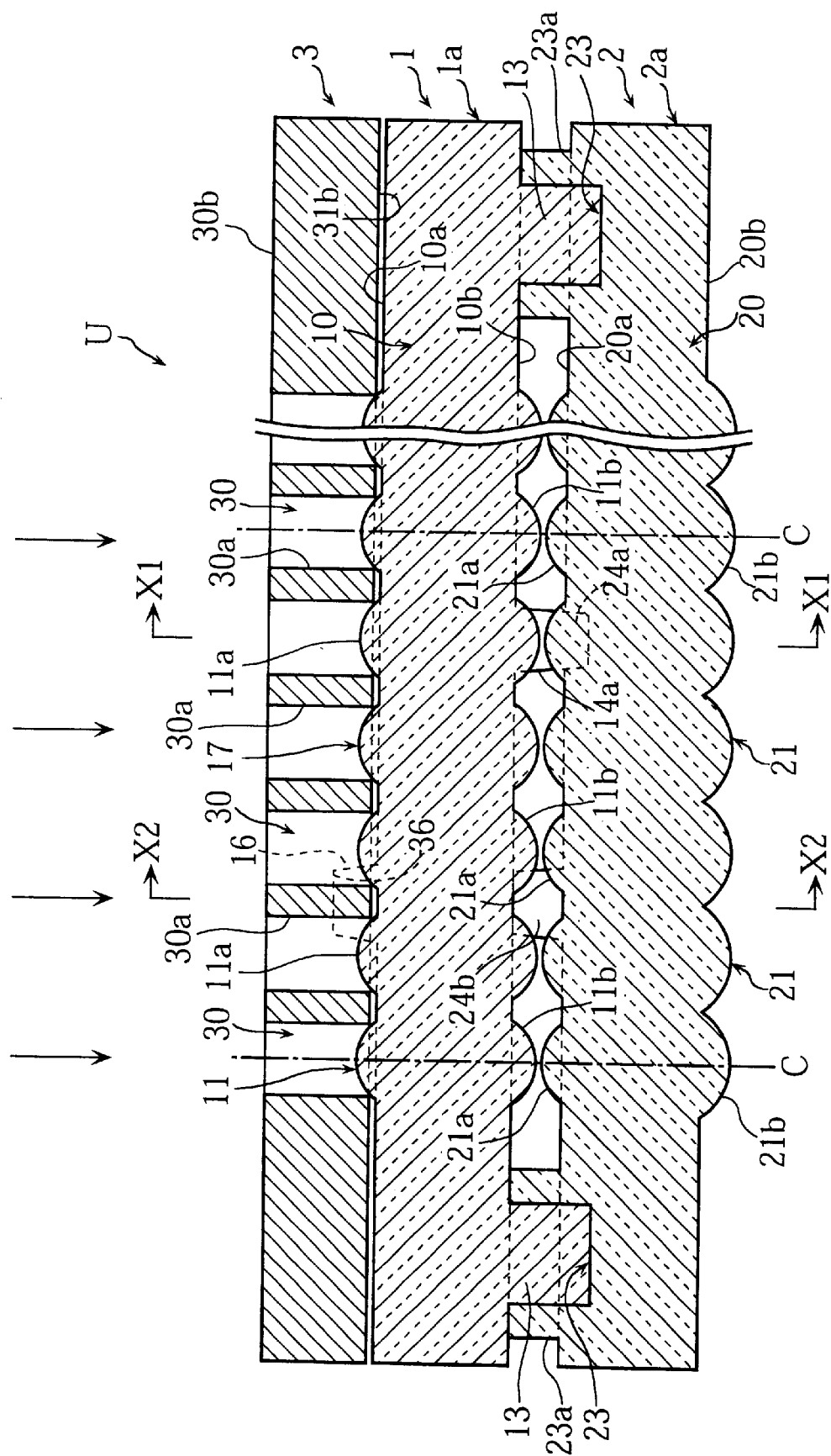
FIG. 2 is a sectional view of the lens array unit shown in FIG. 1.
Figure 3A:
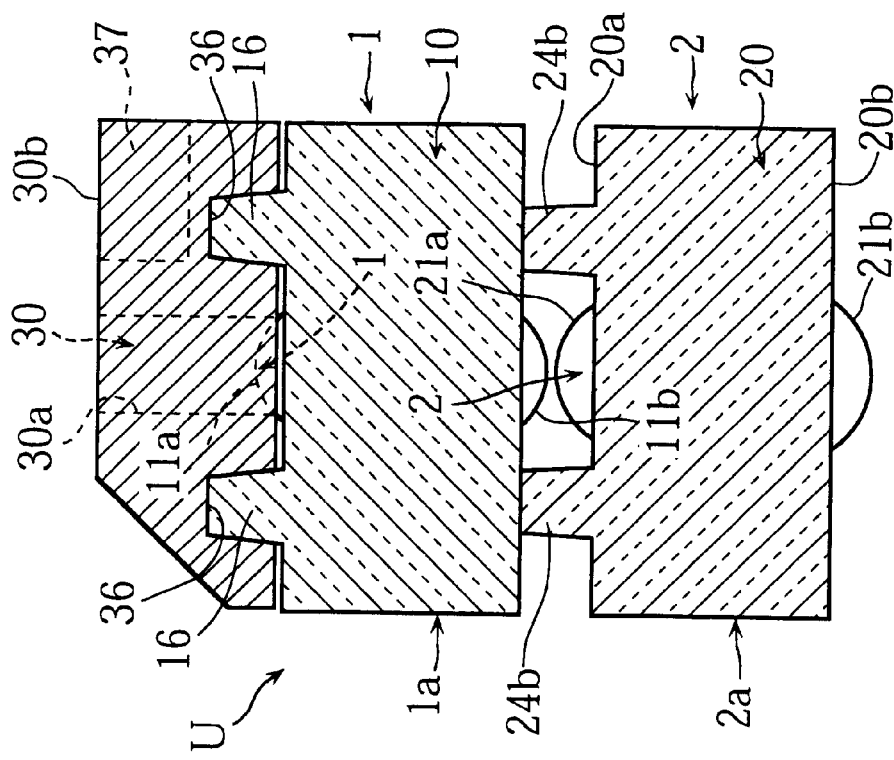
Figure 3B:
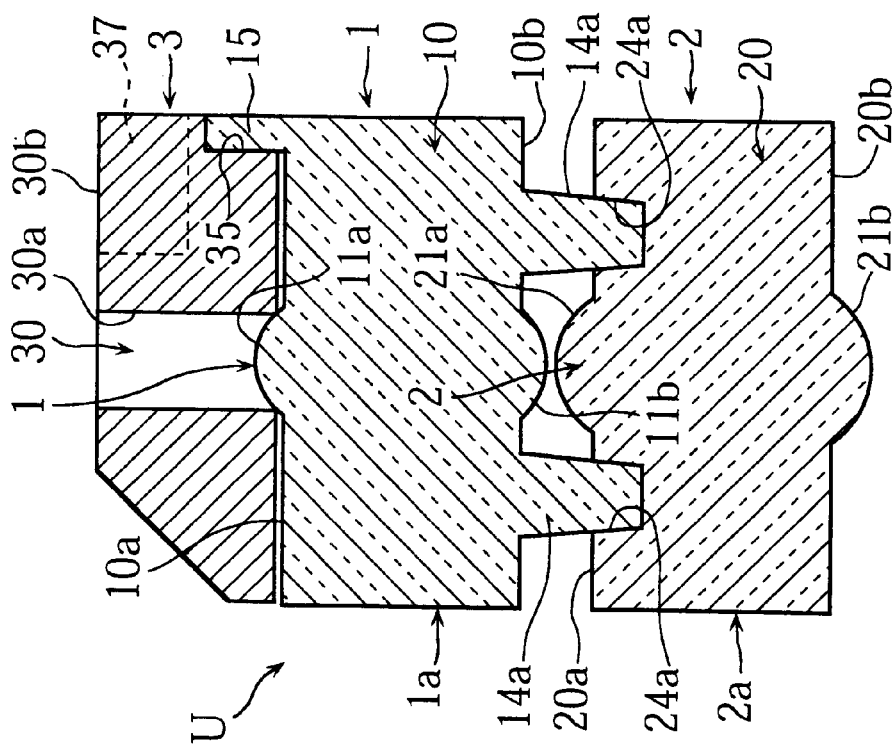
FIG. 3B is a sectional view taken along lines X2—X2 of FIG. 2.

FIGS. 1–3 illustrate an example of lens array unit obtained by a manufacturing process according to the present invention. The lens array unit U illustrated in the figures includes a first lens array 1, a second lens array 2 and a light-shielding member 3.

The first lens array 1 includes a lens array body 1a. The lens array body 1a is provided with a plurality of first lenses 11 arranged straight at predetermined pitches, and with a first holder portion 10 integrally connected to the first lenses 11. The second lens array 2 is basically similar in structure to the first lens array 1. The second lens array 2 includes a lens array body 2a. The lens array body 2a is provided with a plurality of second lenses 21 arranged straight at predetermined pitches, and with a second holder portion 20 integrally connected to the second lenses 21.

Each of the lens array bodies 1a, 2a is in the form of an elongated block and made of a light-permeable synthetic resin. Examples of the synthetic resin to make the lens array are PMMA (polymethyl methacrylate) and PC (polycarbonate).

The first lens 11 includes a first and a second lens faces 11a, 11b spaced from each other along the axis C. The first lens 11 is a biconvex lens, with the first and the second lens faces 11a, 11b both being convex. The second lens 21 is provided with a third and a fourth lens faces 21a, 21b spaced from each other along the axis C. The second lens 11 is also a biconvex lens, with the third and the fourth lens faces 21a, 21b being convex. As will be described later, the first, the second, the third and the fourth lens faces 11a, 11b, 21a, 21b have a curvature capable of forming an actual size erect image. Each of the lens faces 11a, 11b, 21a, 21b may be spherical or aspheric. When the lens faces 11a, 11 b, 21a, 21b are to be spherical, it is easy to make them. When the lens faces 11a, 11b, 21a, 21b are aspheric, the aberration can be reduced.

The first lenses 11 and the second lenses 21 are respectively arranged at a pitch of about 1 mm for example. Each lens face 11a, 11b, 21a, 11b may have a diameter of about 0.6–1.0 mm. In this embodiment, as viewed on a projection surface, the lens faces 11a, 11b, 21a, 21b basically increase in diameter gradually from the first lens face 11a toward the fourth lens face 21b, except that the second lens face 11b and the third lens face 21a are substantially equal in diameter.

The first and the second lenses 11, 21 may not be a biconvex lens. If the second lens face 11b, for example, is plane, it is possible to produce an actual size erect image.

The first holder portion 10 has a surface 10b facing the second holder portion 20 and provided with male parts 13 arranged at longitudinally opposite ends. The second holder portion 20 has a surface 20a facing the first holder portion 10 and provided with female parts 23 at longitudinally opposite ends. Each of the female parts 23 is provided with a stepped portion 23a. The first lens array 1 and the second lens array 2 are stacked and connected to each other with the tips of the male parts 13 being fitted into the female parts 23. In this state, the axes C of the first and the second lenses 11, 21 are aligned with each other. The stepped portion 23a engages the surface 10b of the first holder portion 10, thereby defining a gap between the second lens face 11b and the third lens face 21a. The surfaces 10b, 20b are provided, at Longitudinally intermediate portions, with plural sets of male part 14a and female part 24a. The plural sets of male part 14a and female part 24a are arranged at positions avoiding the first and the second lenses 11, 21. As clearly shown in FIG. 3, the fitting of the male parts 14a into the female parts 24a contributes to positioning of the first and the second lens arrays 1, 2 relative to each other.

The surface 20a is further provided with a plurality of male parts 24b. The male parts 24b are arranged at positions avoiding the second lenses 21. Each of the male parts 24b engages the surface 10b to function as a stopper. Thus, the gap between the second lens face 11b and the third lens face 21a is defined also by the male parts 14a, female parts 24a and male parts 24b. Alternatively, female parts may be provided at the first lens array while male parts may be provided at the second lens array.

As clearly shown in FIG. 2, the light-shielding member 3, shaped in the form of a block or sheet having a prescribed thickness, is elongated in a direction, similarly to the first and the second lens arrays 1, 2. The light-shielding member 3 may be made of a resin material, such as PC, which has a coefficient of linear expansion close to that of the first lens array 1 and can be easily colored black. The light-shielding member 3 is formed with a plurality of through-holes 30 arranged in a straight row and located correspondingly to the first and the second lenses 11, 21. Each through-hole 30 has a black, inner wall surface 30a.

The light-shielding member 3 is formed with a plurality of female parts 35 that are open in the surface 31b (reverse surface) and the surface 31c (side surface). The female parts 35 are spaced from each other longitudinally of the light-shielding member 3. Correspondingly to the female parts, the surface 10a of the first holder portion 10 of the first lens array 1 is formed with a plurality of male parts 15. The surface 31b is formed with a plurality of female parts 36 that are open toward the first lens 1. 10 Each of the female parts 36 is tapered, and it widens (increases in sectional area) as proceeding toward its opening side. Correspondingly to the female parts, the surface 10a of the first lens array 1 is provided with a plurality of male parts 16. Each of the male parts 16 decreases in sectional area as it extends toward the top.

Alternatively, male parts may be provided on the light-shielding member while female parts may be provided in the first lens array.

As clearly shown in FIG. 3, with the male parts 15, 16 being fitted into the female parts 35, 36, the light-shielding member 3 is mounted to the first lens array 1 in contact with or adjacent to the surface 10a of the first holder portion 10. Thus, located in front of a corresponding one of the first lens faces 11a, each of the through-holes 30 of the light-shielding member 3 is open to the lens surface.

Each of the first lens face 11a is partially received in the relevant through-hole 30. As clearly shown in FIG. 1, the light-shielding member 3 is formed with at least one female part 37 at a side edge of the surface 31a (obverse surface). The female part 37 is utilized for positioning the light-shielding member 3 in an optical apparatus A, which will be described later.

Next, an image forming process using the above-described lens array unit U will be described with reference to FIG. 4.

Figure 4:
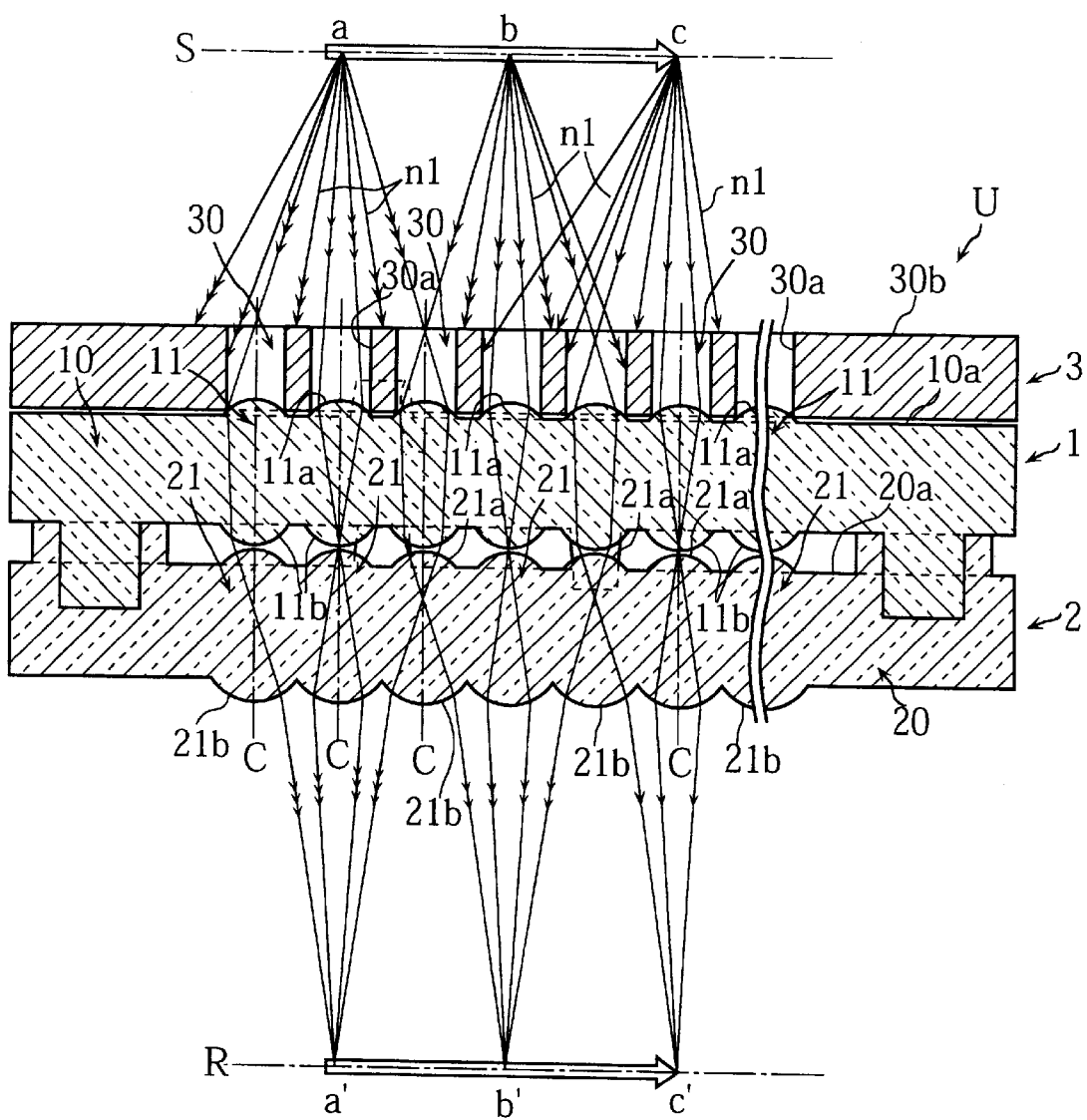
FIG. 4 illustrates the operation of the lens array unit shown in FIG. 1.

In the optical system shown in FIG. 4, light traveling from a starting point S located in front (upper portion in the figure) of the light-shielding member 3 passes through each through-hole 30 of the light-shielding member 3. The light then passes through the first lens 11 and the second lens 21 to reach an image forming point R behind the second lens array 2. Due to the light refracting function of the first and the second lenses 11, 21 aligned on the common axis C, the light is repetitively bent as is in a conventional rod lens. As a result, an actual size erect image (a'→b'→c') of the object (a→b→c) located at the starting point S is formed at the image forming point R. Specifically, in this optical system, the first lens faces 11a of the first lenses 11 form an inverted, reduced image of the object (a→b→c). Subsequently, the second, the third and the fourth lens faces 11b, 21a, 21b magnify and then invert the inverted reduced image. As a result, the actual size erect image of the object is formed at the image forming point R.

Since the surface 10a of the first holder portion 10 is covered with the light-shielding member 3 in the optical system, the light from the starting point S passes through the first lenses 11 without entering the first holder portion 10. Further, as indicated by reference signs n1, light rays from the starting point C at a large inclination angle with respect to the axis C (light rays spreading at a large angle from the starting point S) are prevented by the light-shielding member 3 from entering the first lenses 11. Thus, by the provision of the light-shielding member 3, only the light rays spreading with a small angle from the starting point S are allowed to enter the lenses, which prevents the cross talk between the adjacent lenses 11 and 21.

The first and the second lens arrays 1, 2 and the light-shielding member 3 described above may be manufactured by the process described below.

Figure 5:
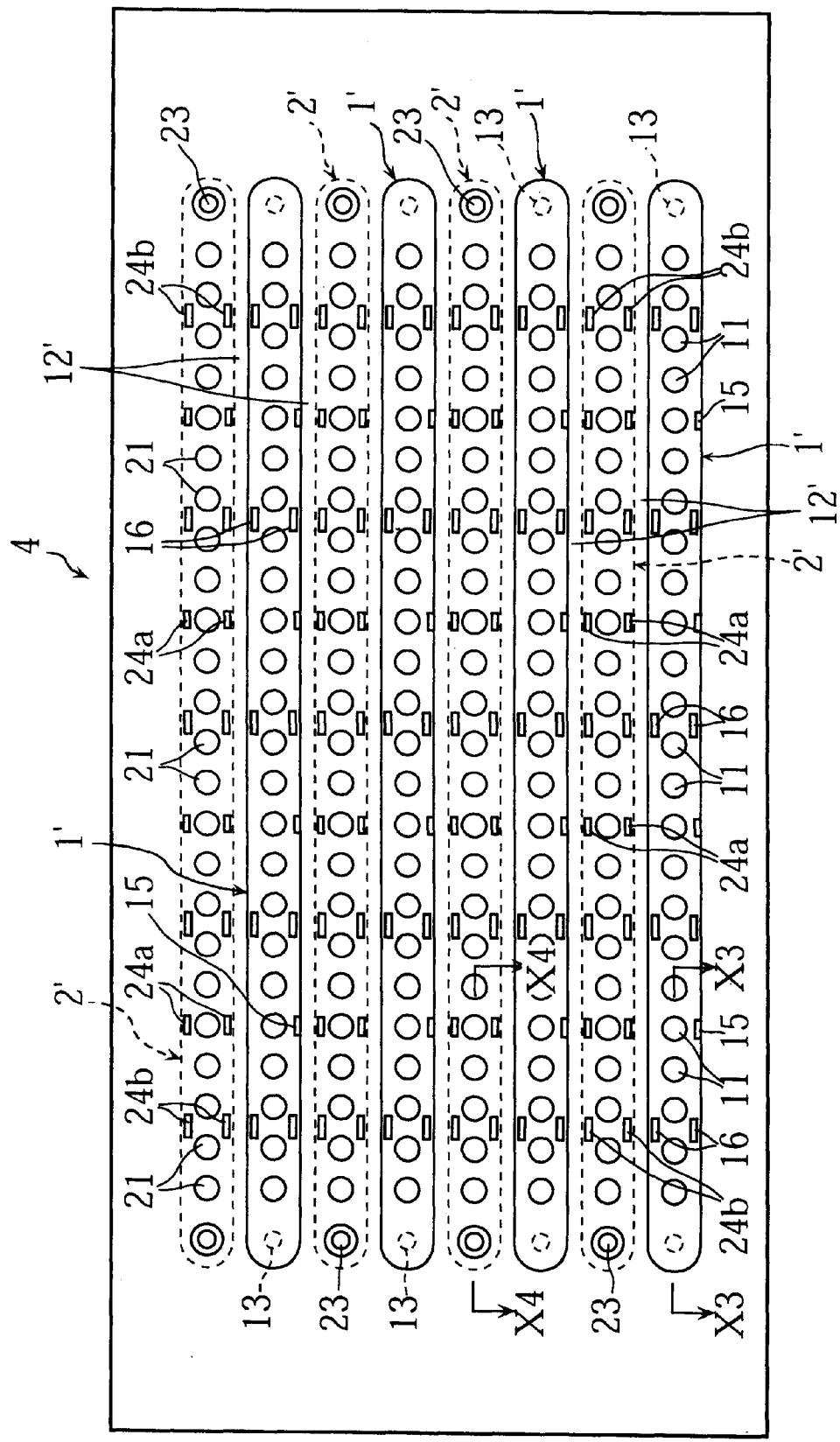
FIG. 5 is a plan view showing a resin casting for forming first lens arrays and second lens arrays.
Figure 6A:
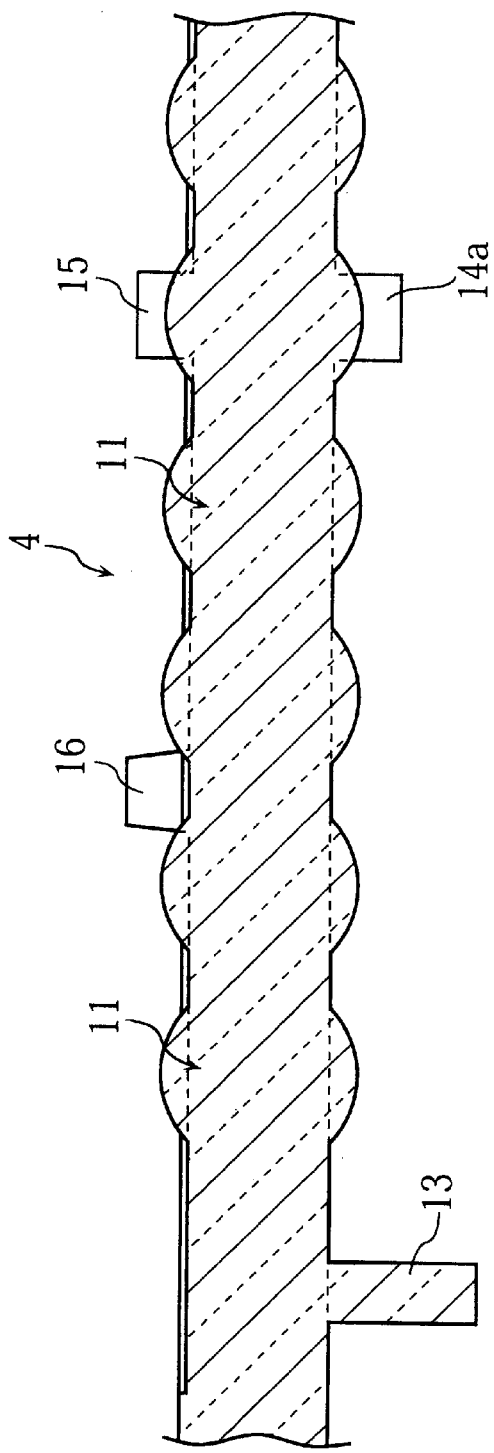
Figure 6B:
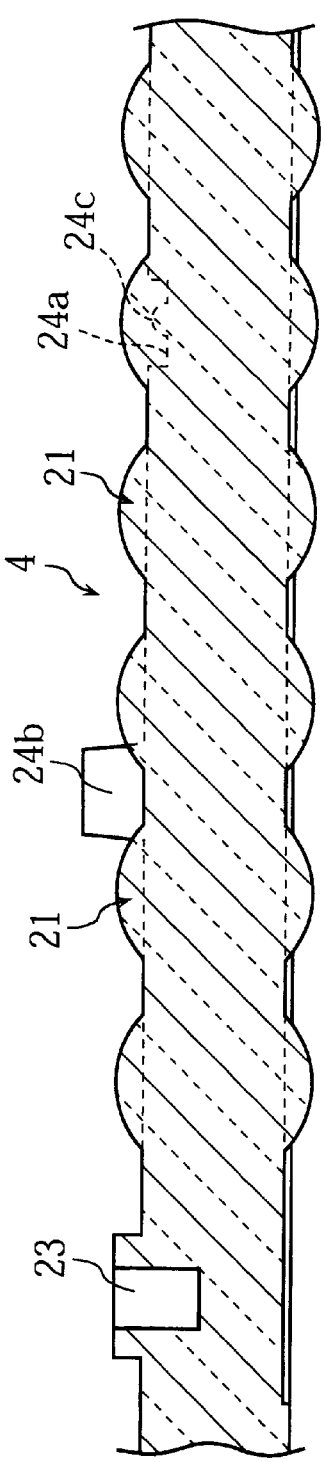
FIG. 6B is a sectional view taken along lines X4—X4 of FIG. 5.

The first lens arrays 1 and the second lens arrays 2 may be cut out of a resin casting 4 as shown in FIGS. 5, 6A, 6B.

The resin casting 4 includes a plurality of first lens array regions 1' which later become the first lens arrays 1, and a plurality of second lens array regions 2' which later become the second lens arrays 2. The first lens array regions 1' and the second lens array regions 2' are alternately arranged as spaced from each other widthwise at a predetermined pitch. Between each first lens array region 1' and the adjacent second lens array region 2' is defined a region 12' (boundary region) which has a width corresponding to the thickness of a rotary blade 50 to be described later. The first lens array region 1' and the second lens array region 2' are formed with portions corresponding to a plurality of first and second lenses 11, 21, male parts 13, 14a, 15, 24b, and female parts 23, 24a. As shown in FIG. 6B, the female part 24a is formed, at the bottom surface, with a spherical projection 24c. The projection 24c is provided for concentrating ultrasonic energy when ultrasonic vibration is supplied, which will be described later.

The resin casting may be obtained by molding a resin material. Specifically, to produce the resin casting, a transparent resin such as PMMA in a molten state is poured into a cavity defined by an upper and a lower mold members. Then, the resin is solidified, and taken out from the mold.

Figure 7:
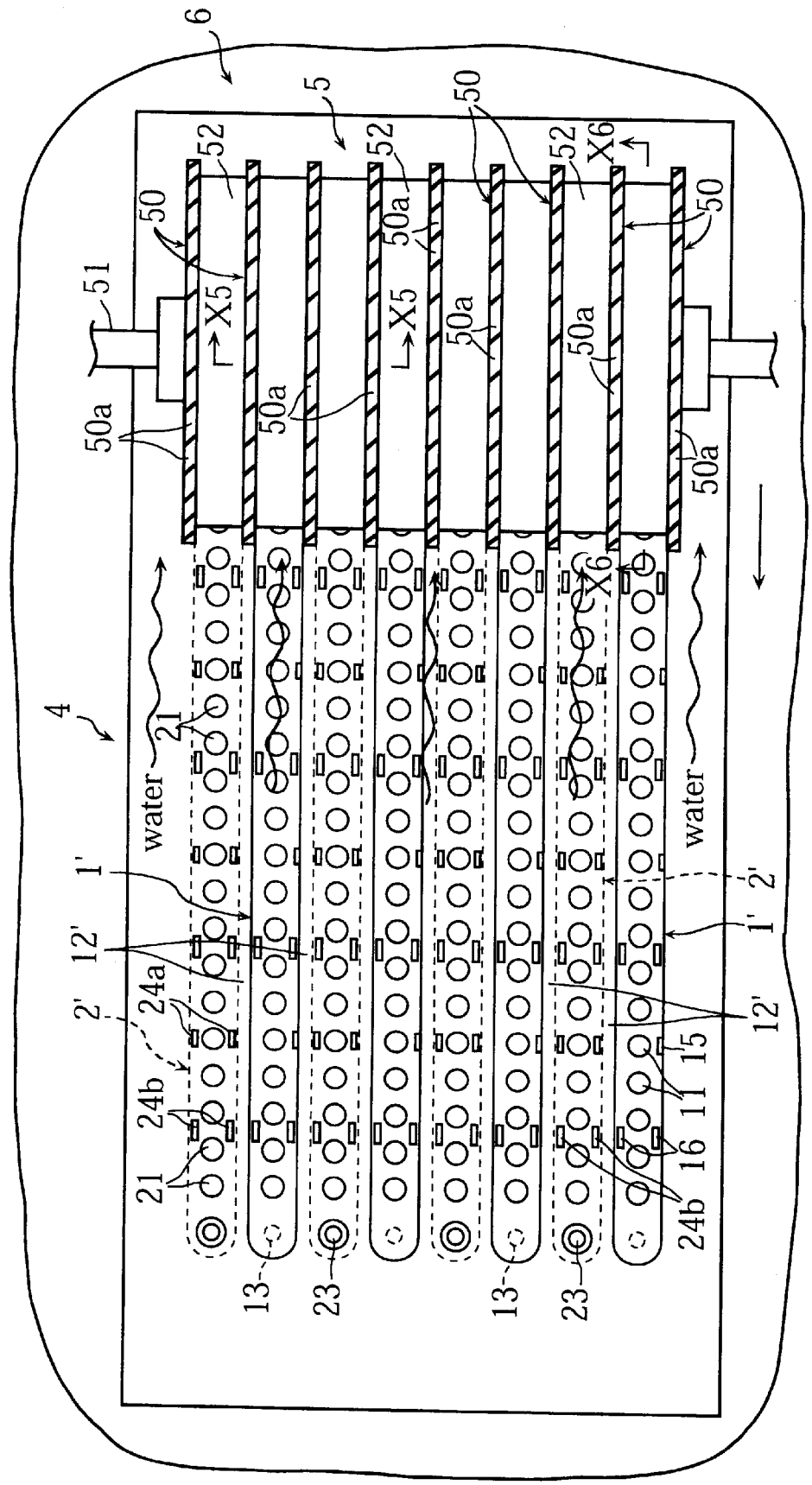
FIG. 7 is a plan view illustrating the step of forming slits in the resin casting of FIG. 5.
Figure 9:
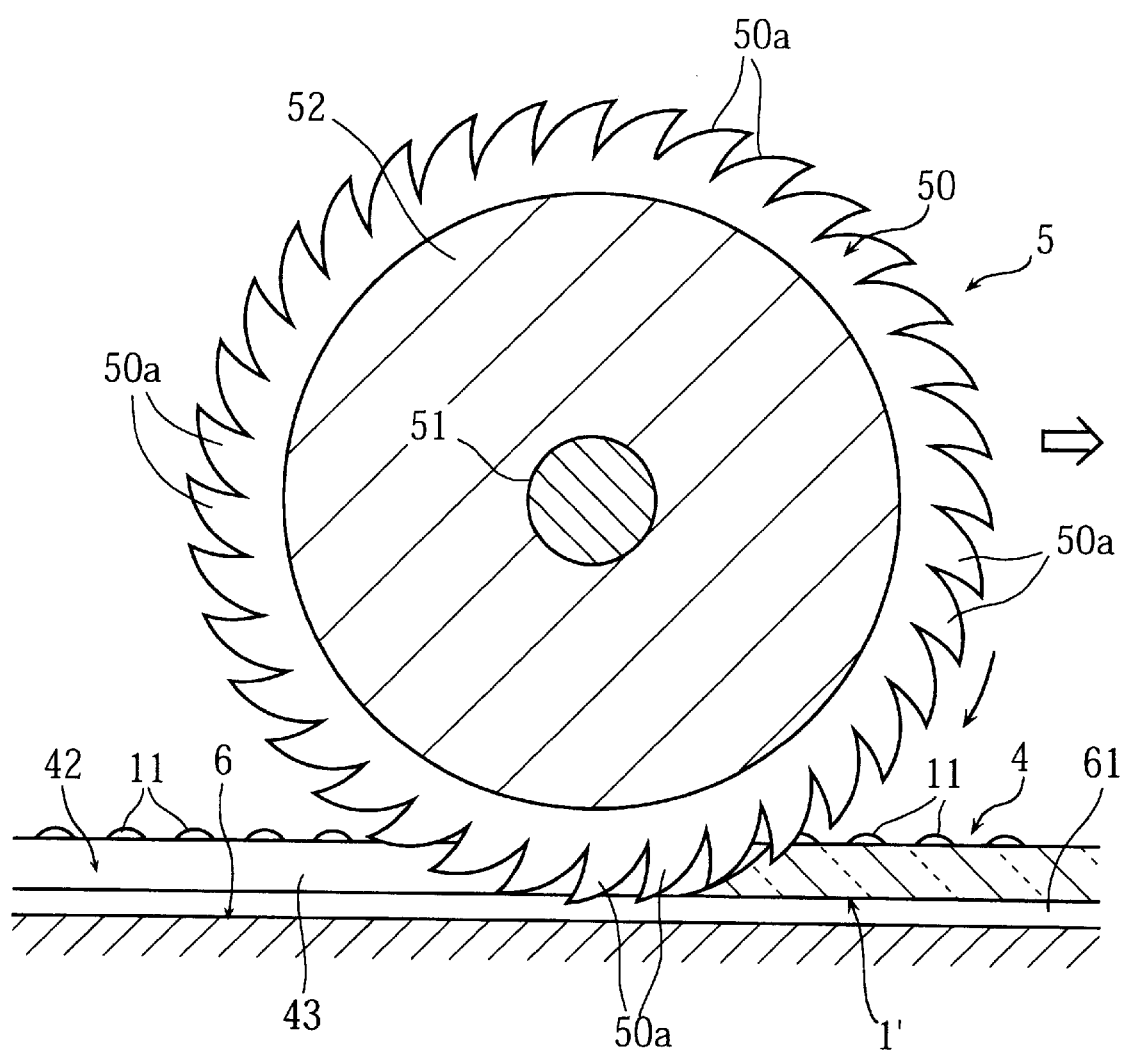
FIG. 9 is a sectional view taken along lines X6—X6 of FIG. 7.

As shown in FIGS. 7 and 9, the first lens arrays 1 and the second lens arrays 2 are cut out from the resin casting 4 using a multi-blade rotary cutter 5.

The multi-blade rotary cutter 5 includes a plurality of coaxially arranged rotary blades 50. The rotary blades 50 rotate simultaneously upon rotation of a single rotation shaft 51. The number of the rotary blades 50 is equal to 1+the total number of the first and the second lens array regions 1' and 2'. For example, when four first lens array regions 1' and four second lens array regions 2' are provided, the number of the rotary blades 50 is nine. A spacer 52 is disposed between two adjacent rotary blades 50 so that the spacing between the adjacent rotary blades 50 is constant. The spacer 52 has a thickness corresponding to the width of the first lens array region 1' and the second lens array region 2'.

For example, when the resin casting 4 is 20–30 cm in length and 0.5–2.0 mm in thickness, the rotary blades 50 maybe 5–15 cm in diameter and 0.1–0.5 mm in thickness. Each rotary blade 50, made of hard metal, may have 100–200 sawteeth 50a.

When the resin casting 4 is to be cut by using the rotary cutter 5, the resin casting 4 is secured to a support base 6.

The support base 6 is formed with a plurality of grooves 60, 61 extending longitudinally of the resin casting 4. The grooves 60 are designed to receive convex lens portions 11A, 21A formed in a surface 40 of the resin casting 4 that faces the support base 6. The grooves 61 are designed to prevent the support base from interfering with the tips of the rotary blades 50 that cut through the resin casting 4 during the cutting operation.

Figure 8:
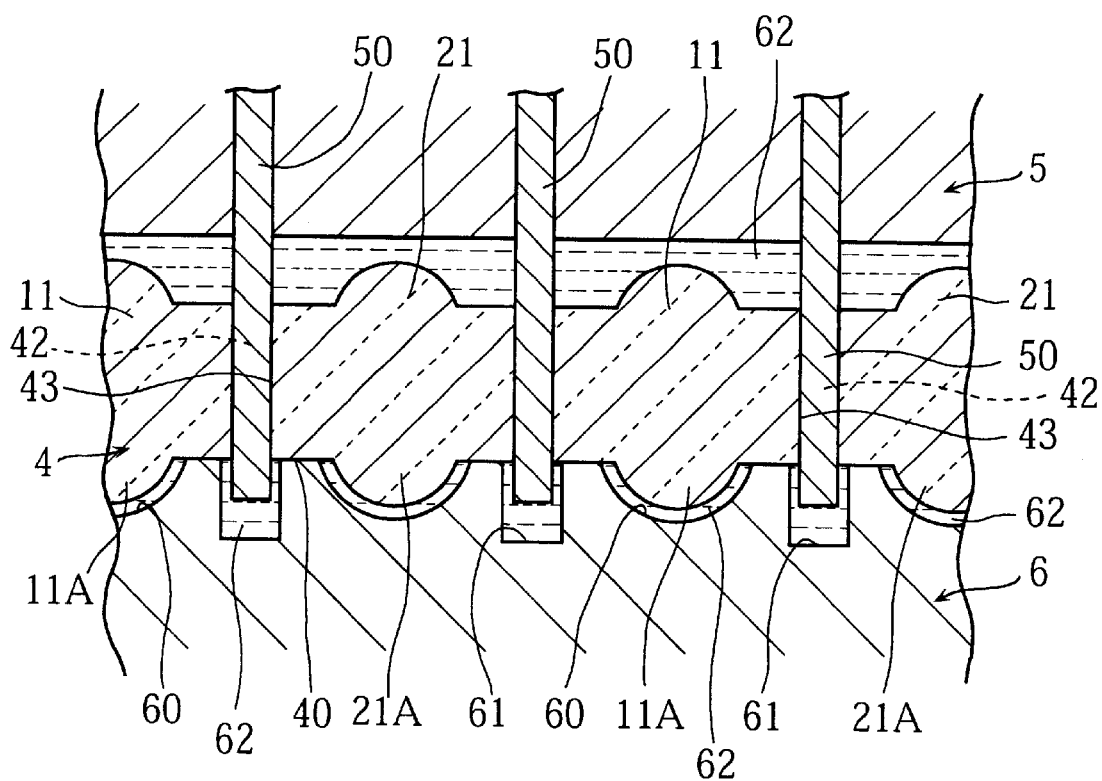
FIG. 8 is a sectional view taken along lines X5—X5 of FIG. 7.
Figure 10:
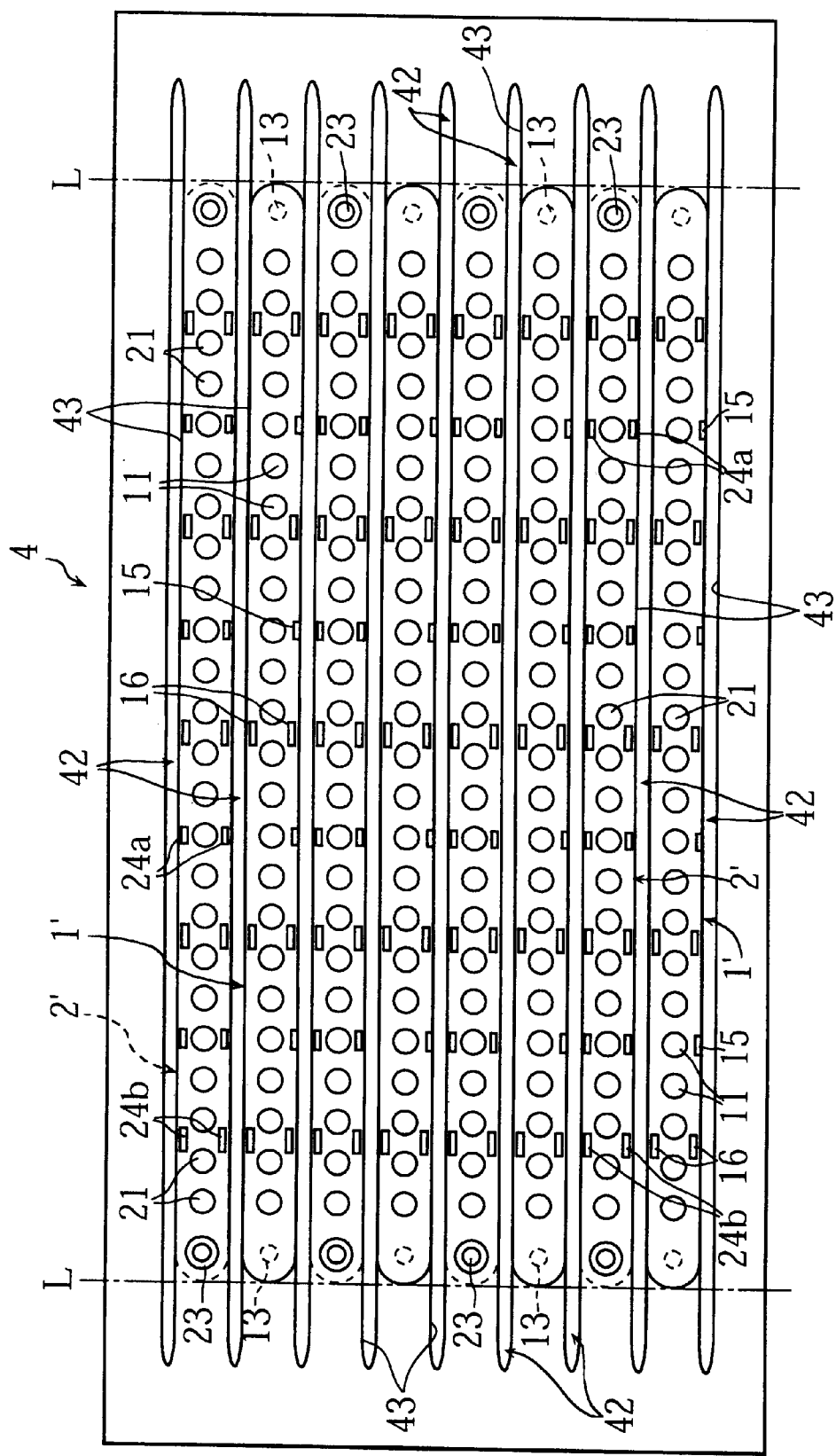
FIG. 10 is a plan view illustrating a resin casting formed with slits.

The cutting of the resin casting 4 proceeds as follows. First, the resin casting 4 is positioned on the support base 6. Then, the rotary blades 50 are positioned on the resin casting 4 to flank the first lens array regions 1' and the second lens array regions 2'. Then, the rotary blades 50, rotated by the action of the rotation shaft 51, are brought into contact with the resin casting 4 and moved longitudinally of the casting. Thus, as shown in FIG. 10, slits 42 are made that flank the first lens array region 1' and the second lens array regions 2'. During this, preferably water 62 is supplied, as shown in FIGS. 7 and 8, to come into contact with the rotary blades 50 and the resin casting 4.

When the resin casting 4 and the rotary blades 50 having the above-specified dimensions are used, the rotary blades 50 may be rotated at a speed of 2,000–6,000 rpm and moved at a speed of 500–2,000 mm/min.

Finally, cuts are made along cutting lines L indicated in FIG. 10, so that separate first and second lens arrays 1, 2 are obtained. The cutting of the resin casting 4 along the lines L may be performed by using a rotary cutter or other suitable means.

In the above-described cutting operation, the multi-blade rotary cutter 5 having rotary blades 50 is used for making longitudinal cuts in the resin casting 4. If otherwise, i.e. with the use of a single rotary blade, the productivity would decrease. Another problem of using a single rotary blade, which can make only one cut at a time, is that the first or second lens array region 1' or 2' may be warped into the space of a previously-made cut when a new cut is being made. With the use of the multi-blade rotary cutter 5, in which the spacing between rotary blades is kept constant by the spacers 52, the first or second lens array regions 1' or 2' are sandwiched between the adjacent rotary blades 50. Therefore, the lens regions 1' and 2' are not warped or bent during the cutting operation. As a result, the slits 42 will be straight, and the cut surfaces 43 will be smooth like a mirror.

When the cutting is performed while supplying water 62 to the rotary blade 50 and the resin casting 4, the water 62 absorbs heat generated due to the friction between the rotary blade 50 and the resin casting 4. Therefore, the cut portion and the adjacent portion are cooled, which prevents the resin casting 4 from melting or softening. Therefore, the obtained cut surfaces 43 can be smooth like a mirror. Also, it is possible to prevent burrs from adhering to the cut surfaces 43. The water 62 supplied during the cutting also contributes to discharging cut powder, thereby preventing adhesion of the burrs to the cut surfaces 43, and hence preventing adhesion of dust via the burrs.

Figure 11A:
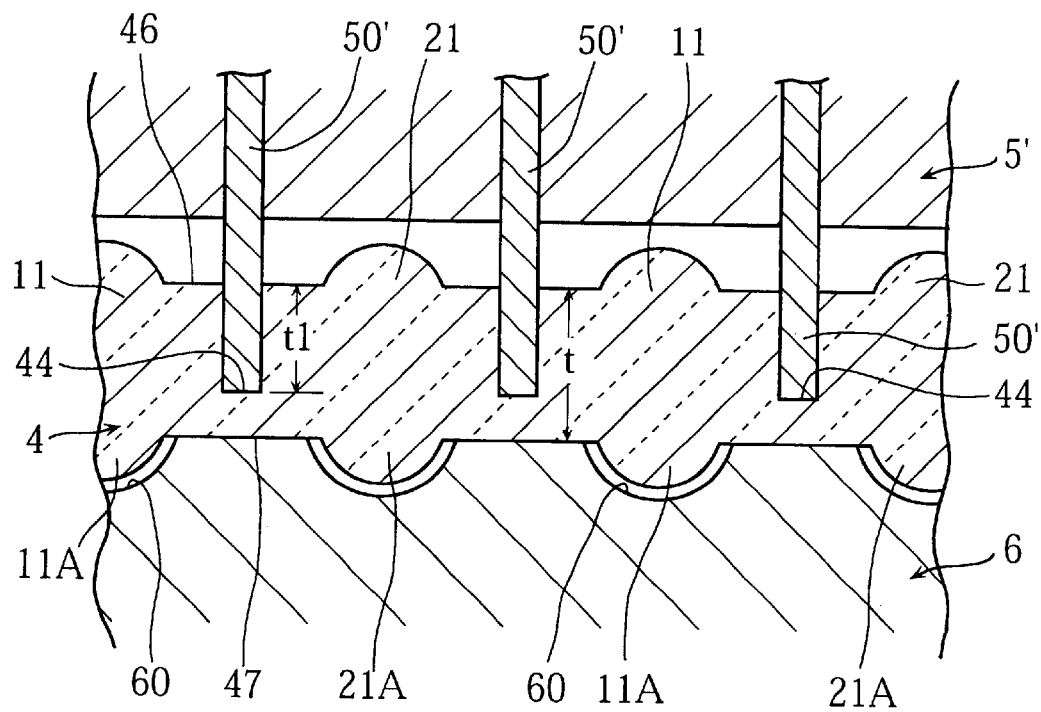
FIGS. 11A and 11B illustrate another example of step for forming slits in a resin casting.
Figure 11B:
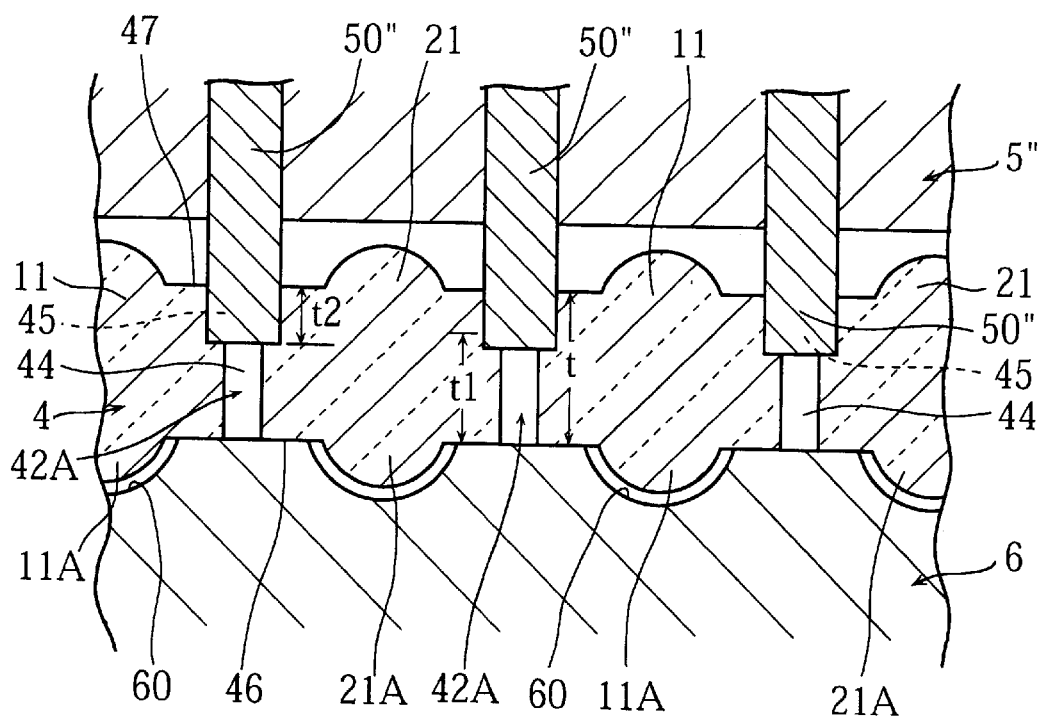

Referring to FIGS. 11A and 11B, for preventing burrs from adhering to the cut surfaces 43, the resin casting 4 may be cut from both the first surface 46 and the second surface 47 with rotary blades 50', 50'' to form slits 43A.

Specifically, firstly as shown in FIG. 11A, the resin casting 4 is cut from the first surface 46 with a plurality of rotary blades 50', thereby forming a plurality of first grooves 44 extending midway in the thickness of the resin casting 4. Each of the first grooves 44 thus formed has a depth t1 which is larger than half of the thickness t of the resin casting 4 at the sides of the lens array regions 1', 2'.

Subsequently, as shown in FIG. 11B, the resin casting 4, after being turned over, is cut from the second surface 47 with a plurality of rotary blades 50'' each of which is larger in thickness than the first rotary blade 50'. Thus, a plurality of second grooves 45 connected to the first grooves 44 are made, thereby forming slits 42A. Each of the second grooves 45 thus formed has a depth t2 which is smaller than half of the thickness t at the sides of the lens array region 1', 2' and which satisfies the inequality t2>(t−t1). In forming the second groove 45 under these conditions, part of each first groove 44 is cut away so that the depth of the first groove 44 becomes smaller than that before the second groove 45 is formed.

In forming the slit 42A, burrs may adhere to a portion adjacent the bottom of the first groove 44 due to the operation of the first rotary blade 50'. Advantageously, the second rotary blade 50", upon reaching the first groove 44, scrapes off the burrs at the first groove 44.

If the rotary blade were operated to penetrate through the resin casting, a relatively large load would be exerted. In the above-described manner, on the other hand, a slit is formed by working rotary blades from both surface sides of the resin casting. Thus, the load exerted on the resin casting is reduced, which contributes to preventing cracks from being made in the lens array.

Referring to FIG. 11B, when the slit 42A is formed with the use of the rotary blades 50' and 50" of different thickness, a stepped portion is formed in the cut surface of the lens array. The stepped portion can be utilized as a reference (positioning reference) for mounting the lens array or the lens array unit in an image forming apparatus. With this arrangement, the lens array unit (or a lens array) is precisely positioned in the apparatus.

Alternatively, the first lens array 1 and the second lens array 2 may be obtained from separate resin castings. Specifically, a resin casting formed with first lens array regions alone and a resin casting formed with second lens array regions 2' alone are separately prepared, and each of the resin castings may be cut to exclusively produce the first lens arrays 1 or the second lens arrays 2.

The light-shielding member 3 may also be made by molding a resin material. In the molding process, the through-holes 30 may be formed by using an accordingly configured mold. Alternatively, the through-holes 30 may be formed by machining or laser beam application with respect to the resin casting. Similarly to the first lens arrays 1 and the second lens arrays 2, a plurality of light-shielding members 3 may be obtained simultaneously by cutting a plate-like resin casting formed with a plurality of regions to become light-shielding members. Alternatively, a single light-shielding member 3 may be obtained with the use of a mold defining a single molding cavity.

The lens array unit U is formed by placing the first lens array 1 on the second lens arrays 2 for connection and placing the light-shielding member 3 on the first lens array 1 for connection. The connection between the first and the second lens arrays 1, 2 and the connection between the first lens array 1 and the light-shielding member 3 are achieved through a step whereby a provisional assembly U' (See FIGS. 12 and 13) is produced by bringing the male parts 14a, 15, 16 into provisional engagement with the female parts 24a, 36, and another step whereby the provisionally engaged portions are subjected to ultrasonic welding.

Figure 12:
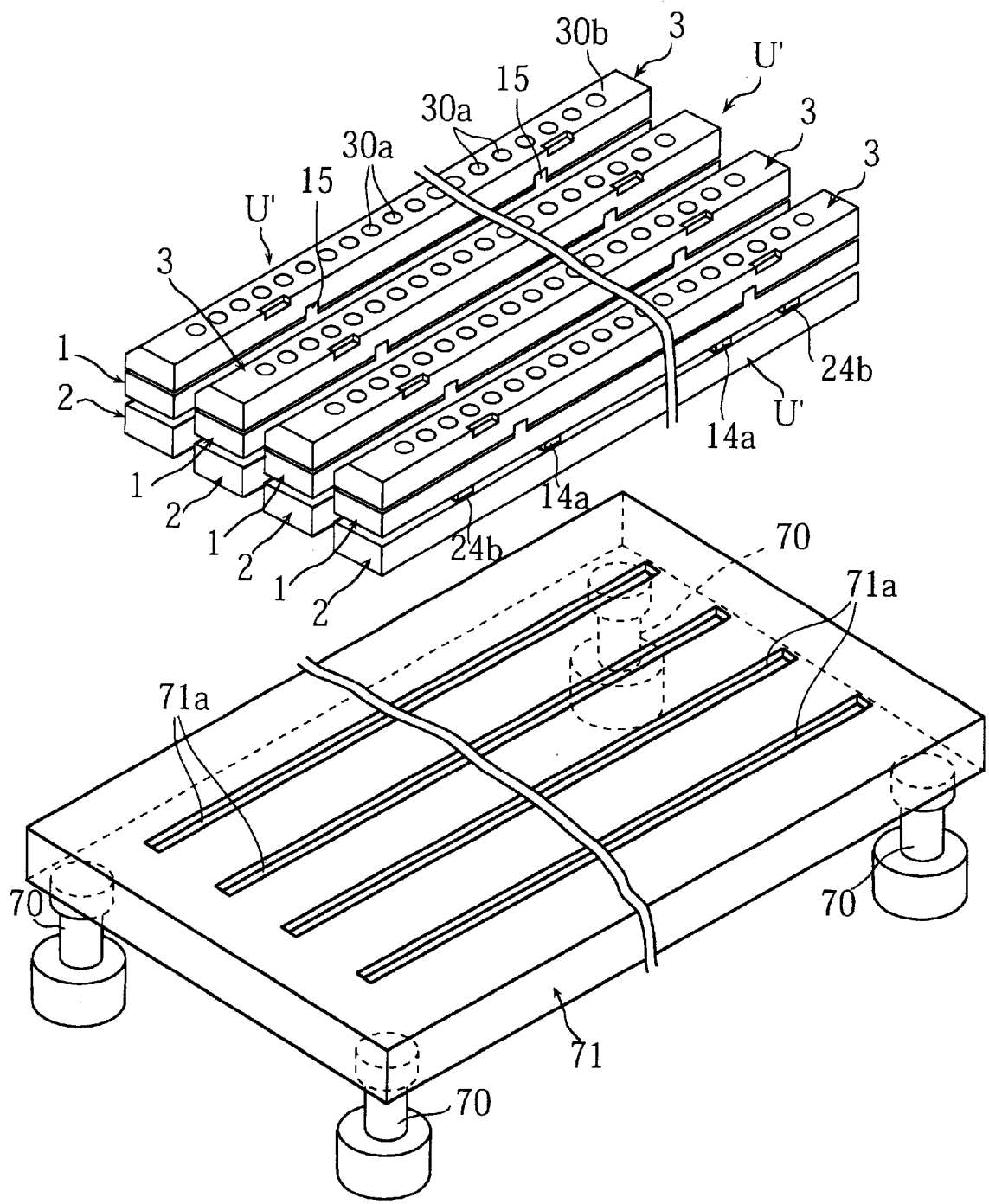
FIG. 12 is a perspective view illustrating a chuck table and provisional assemblies for describing the ultrasonic welding step.
Figure 13:
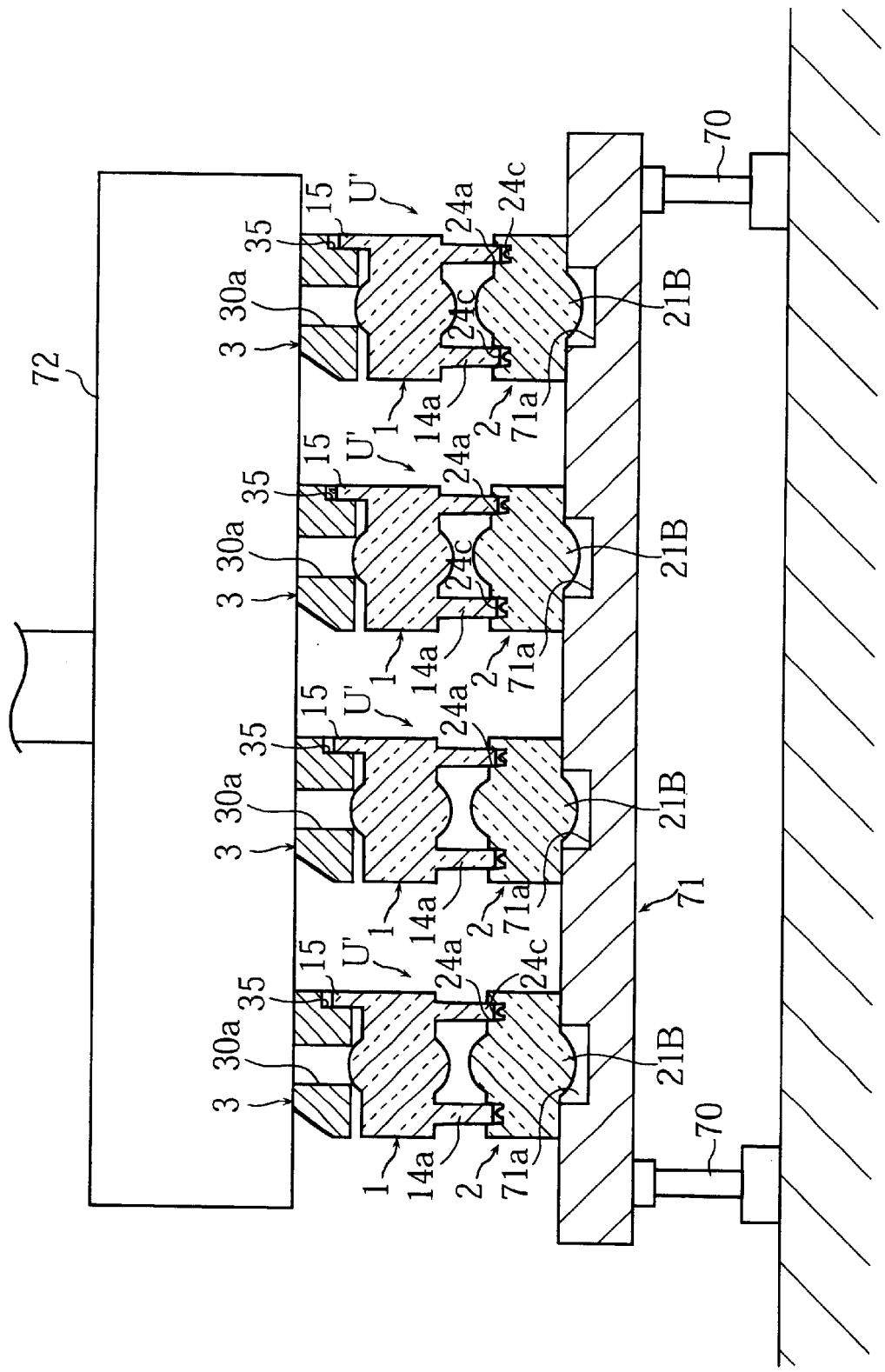
FIG. 13 is a sectional view showing the state where the provisional assemblies are set for describing the ultrasonic welding step.

The ultrasonic welding is performed by placing a plurality of provisional assemblies U' on a chuck table 71, as shown in FIGS. 12 and 13, and applying ultrasonic vibration to the provisional assemblies U'. The ultrasonic vibration are supplied from an ultrasonic horn 72.

Figure 14A:
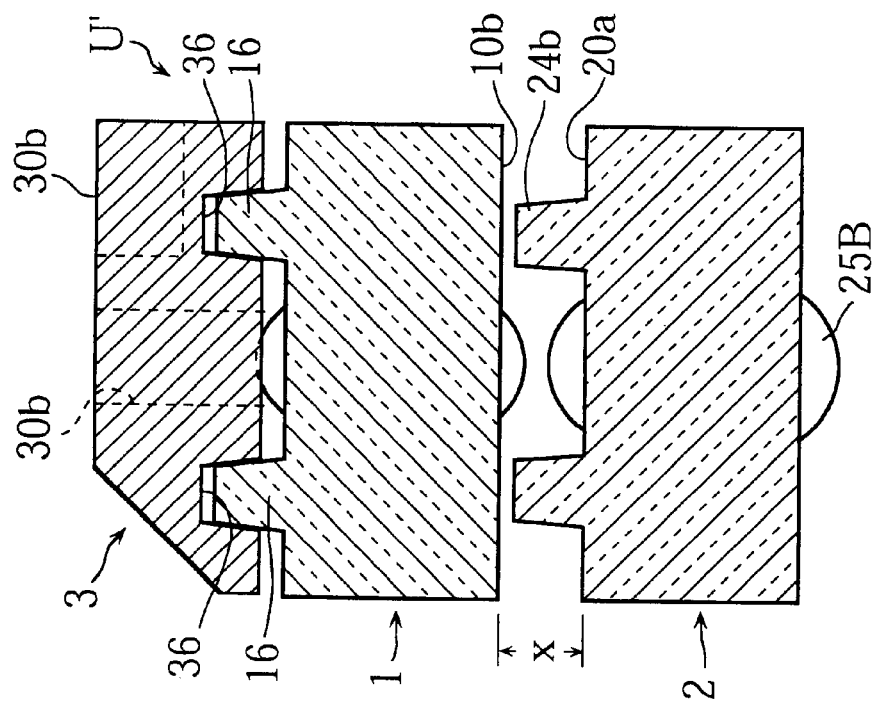
Figure 14B:
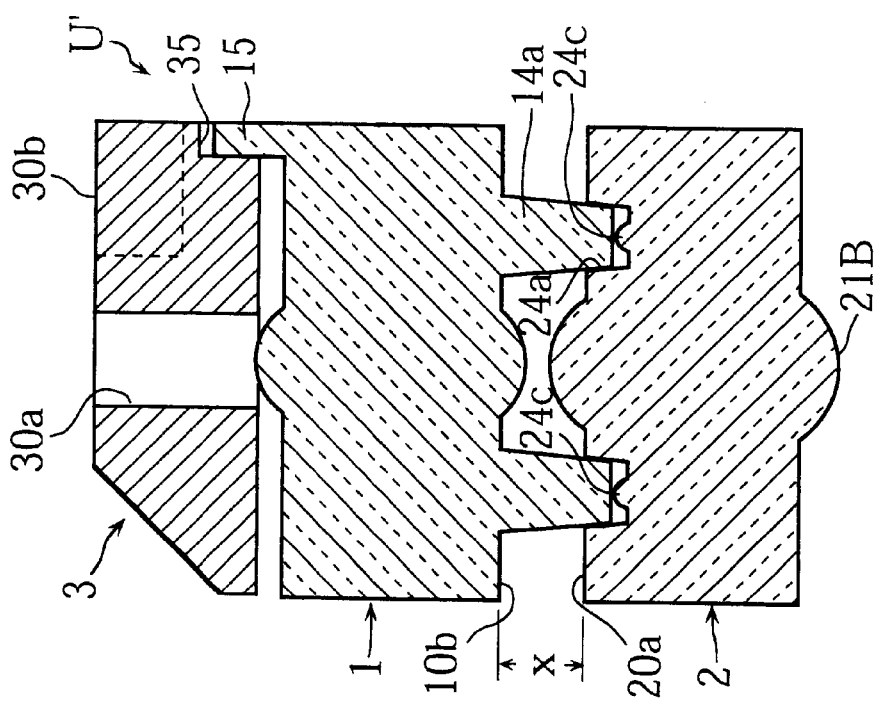
FIG. 14B is a sectional view taken along lines X2—X2 of FIG. 2 showing the provisional assembly before ultrasonic welding.

As shown in FIGS. 13 and 14, in the provisional assembly U', the male parts 14a, 15, 16 are not completely fitted into the female parts 24a, 36.

The chuck table 71 is movable up and down by air cylinders 70. The air cylinders 70 may be provided, for example, at four corners of the chuck table 71, and each air cylinder 70 is connected to one air pressure regulator (not shown). Thus, the air pressures of the air cylinders 70 are automatically equalized to keep the chuck table 71 horizontal. The chuck table 71 is movable up and down by the controlling of the air pressure of the air cylinders 70. With these arrangements, as seen from FIG. 13, the air cylinders 70 can exert a uniform pushing force on the provisional assemblies U' between the ultrasonic horn 72 and the chuck table 71.

The chuck table 71 is provided with a plurality of holding grooves 71a. The holding grooves 71a receive convex lens portions 21B of the provisional assembly U'. The number of holding grooves 71a may depend on the design. For example, when four first lens arrays 1 and four second lens arrays 2 are obtained from a single resin casting 4 as in the case shown in FIG. 5, four holding grooves 71a may be provided to deal with the four provisional assemblies U'.

The ultrasonic horn 72 is large enough to cover all the provisional assemblies U' supported on the chuck table 71. The ultrasonic horn 72 is connected to a non-illustrated ultrasonic generator. The ultrasonic generator may supply longitudinal vibrations to the surface 30b of the light-shielding member 3 of the provisional assembly U'. In this embodiment, the ultrasonic waves supplied from the ultrasonic horn 72 to the provisional assemblies U' have a frequency of 10–30 kHz and an amplitude of 10–30 $\mu$m.

In performing the ultrasonic welding, the ultrasonic horn 72 is held at a fixed position, while the chuck table 71 carrying the provisional assemblies U' is moved upward by the air cylinders 70. Thus, the provisional assemblies U' are brought into contact with the ultrasonic horn 72 and pushed against it. The pressure between the provisional assemblies U' and the ultrasonic horn 72 may be measured by a pressure sensor (not shown). When a predetermined pressure value is reached, ultrasonic wave is supplied to the ultrasonic horn 72 and hence to the provisional assemblies U'. The supplied ultrasonic wave, longitudinal vibration, has the above-mentioned frequency and amplitude. The provisional assemblies U' continue to be pushed by the chuck table 71 at least until the ultrasonic welding is completed.

Figure 15A:
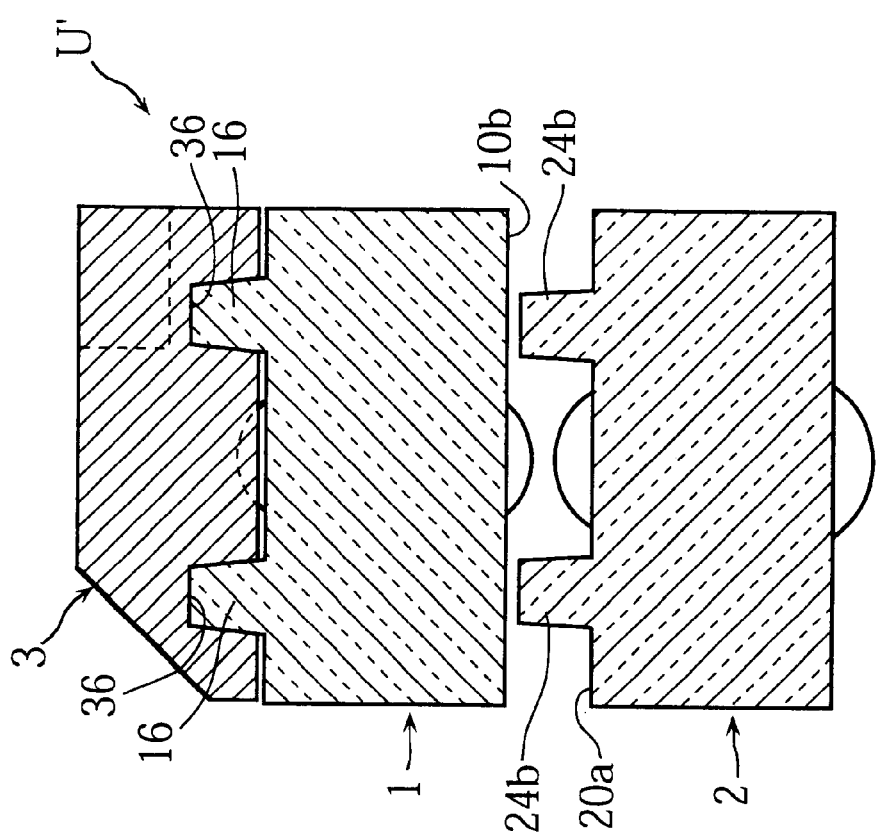
Figure 15B:
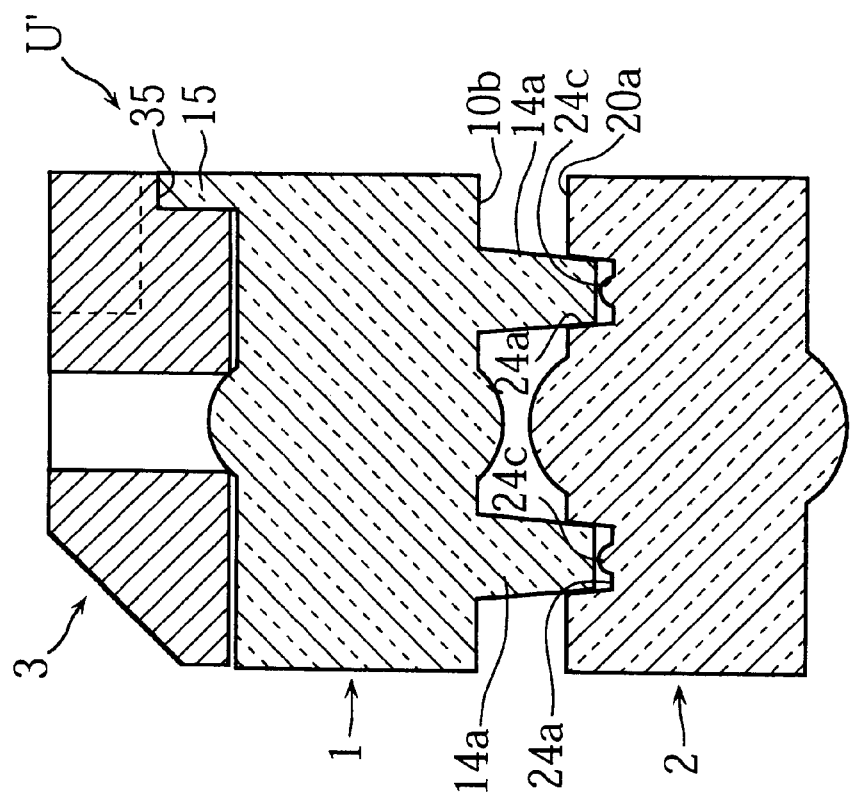
FIG. 15B is a sectional view taken along lines X2—X2 of FIG. 2 showing the provisional assembly in ultrasonic welding.
Figure 16:
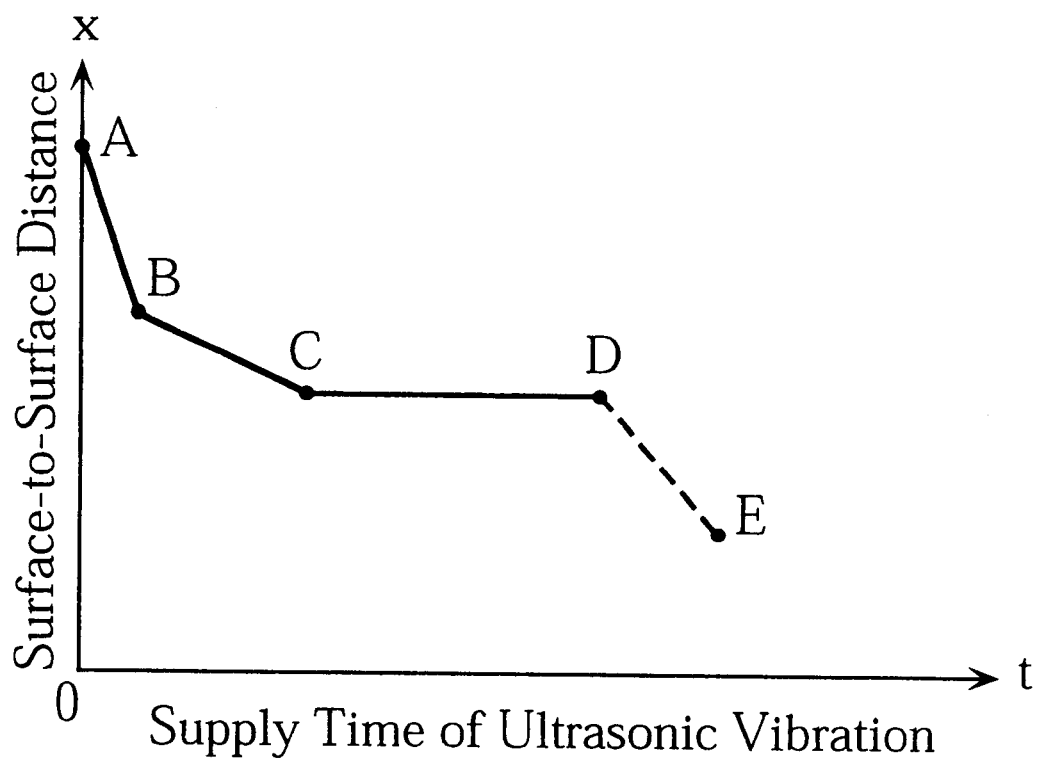
FIG. 16 is a graph showing the variation over time of the surface-to-surface distance in the ultrasonic welding step.

As indicated by the segment A→B in FIG. 16, in the initial stage of the ultrasonic wave application to the provisional assemblies U', the male parts 14a, 15 enter more deeply into the female parts 24a, 35, respectively, by the pressing force of the chuck table 71, thereby decreasing the surface-to-surface distance indicated by the reference sign X in FIG. 14 (the distance between the surface 10b and 20a of the holder portions). In the initial stage, the ultrasonic energy concentrates on the contact area between the male part 16 of the first lens array 1 and the female part 36 of the light-shielding member 3, thereby melting and softening the contact area. Accordingly, as shown in FIGS. 15, the male part 16 is completely fitted into the female part 36. At the same time, the male part 15 of the first lens array 1 is fitted into the female part 35 of the light-shielding member 3, thereby preventing the first lens array 1 and the light-shielding member 3 from approaching further. In this state, the ultrasonic energy does not concentrate on the above-mentioned contact area.

Meanwhile, as shown in FIG. 15, the male part 14a of the first lens array is not completely fitted into the female part 24a of the second lens array 2, and the male part 14a is held in contact with the projection 24c. Accordingly, the supplied ultrasonic energy concentrates on the contact area between the male part 14a and the projection 24c. Thus, as the projection 24c or the male part melts and softens, the surface-to-surface distance x decreases as indicated by the segment B→C in FIG. 16, until the male part 14a is completely fitted into the female part 24a. Thus, the state shown in FIG. 3 is realized. At this stage, the male part 24b of the second lens array 2 abuts on the surface 10b of the first lens array 1, thereby preventing the further approach of the first lens array 1 and the second lens array 2. In this state, as indicated by the segment C→D in FIG. 16, the surface-to-surface distance x is constant.

With the above-described connecting method, the male parts 14a, 16 can be fitted into the female parts 24a, 36 without exerting any thermal stress on other portions. Further, the melting and softening of the fitted portions enables the male parts 14a, 16 to be fitted properly into the female parts 24a, 36 even when there are some dimensional errors in the relevant parts. Accordingly, the prescribed surface-to-surface distance x will result between the lens arrays 1 and 2, and the lens arrays 1, 2 are held in parallel to each other. The welding can be performed instantly, which is advantageous to improving production efficiency. Moreover, the connection of the light-shielding member 3 to the first lens array 1 and the connection of the first lens array 1 to the second lens array 2 can be performed by a single ultrasonic supply. Therefore, it is not necessary to perform a step of connecting the light-shielding member 3 additionally to the step of connecting the first lens array to the second lens array, which is advantageous to achieving high production efficiency.

Typically, the supply of ultrasonic vibration is stopped when the surface-to-surface distance x becomes constant. If the ultrasonic vibration supply were continued, the male part 24 of the second lens array 2 would be melted, whereby the male part 24 would not server as a stopper. Consequently, as indicated by the segment D→E in FIG. 16, the surface-to-surface distance x would decrease more. If this happens, it is not possible to provide the desired surface-to-surface distance x between the first and the second lens arrays 1, 2, and the first and the second lens arrays 1, 2 would not be parallel to each other. In light of this, it is preferable that the ultrasonic vibration supply stops in a period of time during when the surface-to-surface distance x is kept constant, as indicated by the segment C→D in FIG. 16.

As an example, the period of time (C→D in FIG. 16) during which the surface-to-surface distance x is kept constant is 0.1–0.3 seconds, if the first and the second lens arrays 1, 2 are formed of PMMA, the light-shielding member 3 is formed of PC, the male part 24c has a height (radius of curvature) of 100–200 μm, and the ultrasonic vibration of the above-specified properties is supplied to the provisional assembly U'. The total of ultrasonic energy supplied during this period of time is in a range of 20–40 J.

When the three members 1, 2 and 3 are subjected to simultaneous ultrasonic welding, attention is drawn to the welding of the two members 1 and 2, which are relatively far from the ultrasonic horn 72 and therefore less susceptible to the ultrasonic welding. In this case, measurements may be made in advance to the period of time during which the distance between the two members is constant (see the segment C→D in FIG. 16). Then, in performing the simultaneous ultrasonic welding, the supply of ultrasonic vibration is terminated during the above particular period of time. In this manner, the connection areas will not melt excessively, which is crucial for allowing a suitable clearance between facing lenses. The timed termination is also important for avoiding incomplete welding that would allow an unduly large clearance between the facing lenses. Besides these features, the ultrasonic welding can be performed in an extremely short period of time, which contributes to achieve high production efficiency. Further, the ultrasonic welding is clean in a sense that it does not contaminate the lenses 11, 21, whereas an adhesive may deteriorate the optical performance of the lenses by adhesion.

For clear understanding, the above explanation describes that the connection between the light shielding member 3 and the first lens array 1 is achieved first and then the connection between the first lens array 1 and the second lens array 2 is made. Actually, however, the three members are combined in a very short period to time as will be described below, so that the timing of the two connections cannot be distinguished so clearly.

In the lens array unit U, the light shielding member 3 may be formed of a material which differs from that of the lens arrays 1, 2. However, such two members formed of different materials can be connected to each other by ultrasonic welding, because to perform the welding, it suffices that at least one of the two members will be melted. Further, it is possible to simultaneously connect three or more members including a member which differs in material from others.

According to the present invention, the connection of the second lens array may be performed after the light-shielding member is connected to the first lens array. Alternatively, the connection of the light shielding member may be performed after the first lens array is connected to the second lens array. In these cases again, the distance between two members exhibits a tendency similar to that represented by the graph of FIG. 16. Thus, the two members can be properly connected to each other by stopping the supply of the ultrasonic vibration in accordance with the measurements made in advance to the period of time during which the distance between the two members becomes constant.

The ultrasonic welding is applicable to a lens array unit that includes one slight shielding member and one lens array or more than two lens arrays, or applicable to a lens array unit that includes no light shielding member, or applicable to a lens array unit that includes a light shielding film formed directly on a lens array.

Figure 17:
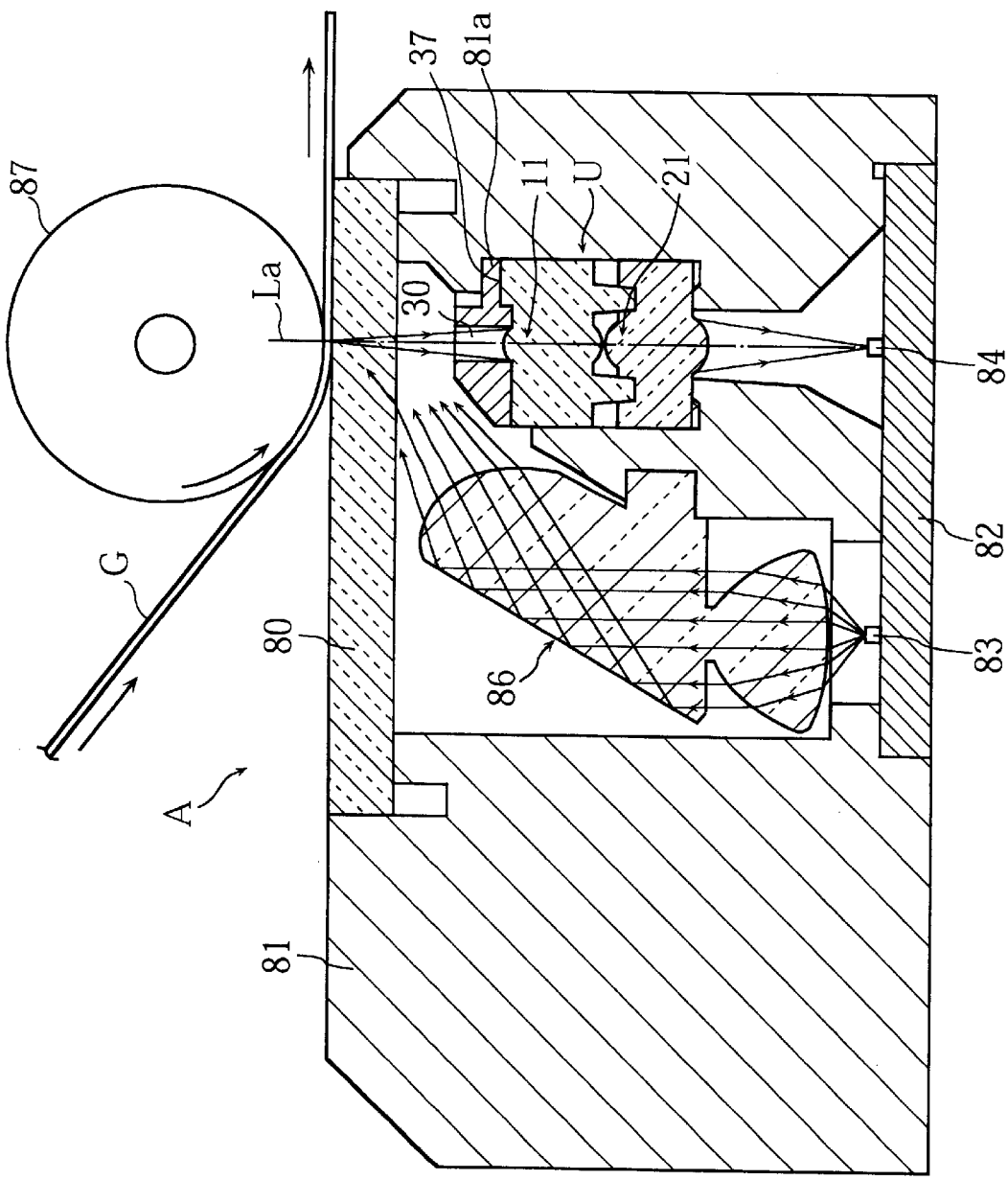
FIG. 17 is a sectional view illustrating an image reading apparatus (an example of optical apparatus) incorporating the lens array unit.

FIG. 17 illustrates an optical apparatus, more precisely an image reading apparatus, embodying the present invention.

The illustrated optical apparatus A includes a transparent plate 80, a casing 81 formed of a synthetic resin for supporting the transparent plate 80 at the upper portion thereof, and a substrate 82 arranged at the bottom portion of the casing 81. The substrate 82 has an obverse surface provided with a plurality of light sources 83 aligned in the primary scanning direction (perpendicular to the sheet surface) at a predetermined pitch, and a plurality of light receiving elements 84 aligned in the same direction as the light sources. Each of the light sources 83 maybe a light emitting diode for example. Upon receiving a light, each of the light receiving elements 84 for photo-electric conversion outputs a signal (image signal) of the level corresponding to the received amount of light.

The above-described lens array unit U is arranged between the transparent plate 80 and the light receiving elements 84. The lens array unit U is so incorporated that the rows of the first and the second lenses 11, 21 extend in the primary scanning direction. The casing 81 is provided with male parts 81a corresponding to the female parts 37 of the light shielding member 3. The fitting of the respective male parts 81a into the corresponding female parts 37 enables the positioning of the light shielding member 3 relative to the casing 81 and prevents the light shielding member 3 from shifting upward. The transparent plate 80 has an obverse surface on which a linear image reading region La is defined at a portion corresponding to the through-holes 30 and the first lenses 11.

Light emitted from each light source 83 travels trough a light guide member 86 to reach the image reading region La.

The light guide member 86 may be formed of transparent PMMA or PC for example. Of course, the present invention is not limited to these features. For example, the light emitted from each light source 83 may be directed to the image reading region La without using the light guide member 86 or using a light guide member configured differently from the light guide member 86. A platen roller 87 for transferring a document G is provided above the image reading region La.

In the optical apparatus A, light emitted from each light source 83 is directed to the image reading region La to irradiate the document G. The light reflected at the document G travels toward the lens array unit U. As a result, due to the operation described with reference to FIG. 4, an actual size erect image for one line of the document G at the image reading region La is formed on the light receiving elements 84. Thus, the light receiving elements 84 output image signals for the one line of the image of the document G. Such an image reading process is repeated while the document G is transferred in the secondary scanning direction by the platen roller 87. As the means for forming the document image, the optical apparatus A utilizes the lens array unit U manufactured by the above-described process. Therefore, the optical apparatus A having high optical performance can be prepared at a relatively low cost.

The specific structure of the present invention is not limited to the above-described embodiments, and may be modified in various ways.

What is claimed is:

1. A process for making a lens array unit comprising:
    a lens array forming step for forming both a first lens array including a plurality of first lenses arranged in a line and a second lens array including a plurality of second lenses arranged in a line; and
    a lens array connecting step for connecting the first lens array to the second lens array so that a lens axis of each of the first lenses is aligned with a lens axis of a corresponding one of the second lenses;
    wherein the lens array connecting step includes supplying of ultrasonic vibration.

2. The process for making a lens array unit according to claim 1, wherein one of the first and the second lens arrays is provided with a male part whereas the other of the lens arrays is provided with a female part; and
    wherein in the lens array connecting step, the male part is provisionally fitted into the female part to provide a provisional assembly to which the ultrasonic vibration is supplied for melting or softening at least one of an obverse surface of the male part and an inner surface of the female part so that the male part is completely fitted into the female part.

3. The process for making a lens array unit according to claim 2, wherein the obverse surface of the male part or the inner surface of the female part is provided with a projection for concentrating ultrasonic energy in supplying the ultrasonic vibration.

4. The process for making a lens array unit according to claim 2, wherein one of the first lens array and the second lens array is provided with a stopper for engaging the other lens array when the male part is fitted into the female part.

5. The process for making a lens array unit according to claim 2, wherein the male part includes a first taper surface; and
    wherein the female part includes a second taper surface for engaging the first taper surface when the male part is provisionally fitted into the female part.

6. The process for making a lens array unit according to claim 2, wherein supplying of the ultrasonic vibration to the provisional assembly is terminated within a predetermined time period during which a distance between the first lens array and the second lens array ceases to vary and remain constant after the supplying of the ultrasonic vibration has begun.

7. The process for making a lens array unit according to claim 6, wherein the ultrasonic vibration is supplied with an ultrasonic horn pressed against an ultrasonic supply surface of the provisional assembly, the ultrasonic horn being capable of supplying longitudinal vibration.

8. The process for making a lens array unit according to claim 7, wherein the ultrasonic vibration supplied to the ultrasonic supply surface has a frequency of 10–30 kHz and a total energy of 20–40 J.

9. The process for making a lens array unit according to claim 1, wherein the lens array unit further comprises a light-shielding member formed with a plurality of through-holes, each of the through-holes being positioned in facing relationship to a corresponding one of the first lenses; and
    wherein in the lens array connecting step, the light-shielding member is connected to the first lens array by utilizing the ultrasonic vibration supplied for ultrasonic welding of the first lens array to the second lens array.

10. The process for making a lens array unit according to claim 9, wherein the light-shielding member is different in material from the first lens array.

11. The process for making a lens array unit according to claim 1, wherein the lens array forming step includes cutting the first lens array or the second lens array out of a resin casting formed with a plurality of lens array regions;
    wherein each of the lens array regions is formed with a plurality of first lenses or second lenses arranged in a line, the plurality of lens array regions being aligned with each other in a direction transverse to the line of the first lenses or the second lenses; and
    wherein the cutting of the first lens array or the second lens array includes forming slits simultaneously at sides of the lens array regions using a multiple-blade rotary cutter including a plurality of rotary blades regularly spaced from each other at a pitch corresponding to a dimension of each of the lens array regions in the transverse direction.

12. The process for making a lens array unit according to claim 11, wherein the forming of the slits includes:
    a first step of cutting the resin casting from a first surface of the resin casting with a plurality of first rotary blades to form a plurality of first grooves extending to an intermediate point of a thickness of the resin casting; and
    a second step performed after the first step for cutting the resin casting from a second surface opposite the first surface with a plurality of second rotary blades which are thicker than the first rotary blades to form a plurality of second grooves connected to the first grooves to provide the slits.

13. The process for making a lens array unit according to claim 12, wherein the first and the second steps are performed to satisfy the inequalities of $$t1 > t/2,\ t2 > (t-t1),\ t2 < t/2$$

where $t1$ is a depth of each of the first grooves before the second step is performed,
$t2$ being a depth of each of the second grooves and t being a thickness of the resin casting at the sides of the plurality of lens array regions.

14. The process for making a lens array unit according to claim 1, wherein the lens array unit serves as image forming means in an optical apparatus for converging light traveling from an object for forming an image of the object at a predetermined position.

15. A process for making a lens array unit comprising:
    a lens array forming step for forming a lens array including a plurality of lenses arranged in a line; and
    a light-shielding member connecting step for connecting a light-shielding member formed with a plurality of through-holes arranged in a line to the lens array so that each of the through-holes is positioned in facing relationship to a corresponding one of the lenses;
    wherein the light-shielding member connecting step includes supplying of ultrasonic vibration.

16. The process for making a lens array unit according to claim 15, wherein one of the lens array and the light-shielding member is provided with a male part whereas the other one is provided with a female part;
    wherein in the light-shielding member connecting step, the male part is provisionally fitted into the female part to provide a provisional assembly to which the ultrasonic vibration is supplied for melting at least one of an obverse surface of the male part and an inner surface of the female part for completely fitting the male part into the female part; and
    wherein supplying of the ultrasonic vibration to the provisional assembly is terminated within a predetermined time period during which a distance between the lens array and the light-shielding member ceases to vary and remain constant after the supplying of the ultrasonic vibration has begun.

17. The process for making a lens array unit according to claim 16, wherein the male part includes a first taper surface; and
    wherein the female part includes a second taper surface for engaging the first taper surface when the male part is provisionally fitted into the female part.

18. The process for making a lens array unit according to claim 16, wherein the ultrasonic vibration is supplied with an ultrasonic horn pressed against an ultrasonic supply surface of the provisional assembly, the ultrasonic horn being capable of supplying longitudinal vibration.

19. The process for making a lens array unit according to claim 18, wherein the ultrasonic vibration supplied to the ultrasonic supply surface has a frequency of 10–30 kHz and a total energy of 20–40 J.

20. The process for making a lens array unit according to claim 15, wherein the light-shielding member is different in material from the lens array.

21. A process for making a lens array unit comprising:
    a lens array forming step for forming both a first lens array including a plurality of first lenses arranged in a line and a second lens array including a plurality of second lenses arranged in a line; and
    a lens array connecting step for connecting the first lens array to the second lens array so that a lens axis of each of the first lenses is aligned with a lens axis of a corresponding one of the second lenses;
    wherein the lens array forming step includes cutting the first lens array or the second lens array out of a resin casting formed with a plurality of lens array regions;
    wherein each of the lens array regions is formed with a plurality of first lenses or second lenses arranged in a line, the plurality of lens array regions being aligned with each other in a direction transverse to the line of the first lenses or the second lenses; and
    wherein the cutting of the first lens array or the second lens array includes forming slits simultaneously at sides of the lens array regions using a multiple-blade rotary cutter including a plurality of rotary blades regularly spaced from each other at a pitch corresponding to a dimension of each of the lens array regions in the transverse direction.

22. The process for making a lens array unit according to claim 21, wherein the forming of the slits includes:
    a first step of cutting the resin casting from a first surface of the resin casting with a plurality of first rotary blades to form a plurality of first grooves extending to an intermediate point of a thickness of the resin casting; and
    a second step, performed after the first step, for cutting the resin casting from a second surface opposite the first surface with a plurality of second rotary blades which are thicker than the first rotary blades to form a plurality of second grooves connected to the first grooves to provide the slits.

23. The process for making a lens array unit according to claim 22, wherein the first and the second steps are performed to satisfy the inequalities of $$t1 > t/2,\ t2 > (t-t1),\ t2 < t/2$$

where t1 is a depth of each of the first grooves before the second step is performed,
t2 being a depth of each of the second grooves, and
t being a thickness of the resin casting at the sides of the plurality of lens array regions.

24. The process for making a lens array according to claim 23, wherein the resin casting includes a plurality of first lens array regions and a same number of second lens array regions, each of the first lens array regions being to be a first lens array, each of the second lens array regions being to be a second lens array;
    wherein the lens array forming step includes obtaining plural pairs of a first lens array and a second lens array from one resin casting; and
    wherein the lens array connecting step includes connecting the first lens array to the paired second lens array simultaneously.

25. A process for making a lens array comprising the steps of:
    preparing a resin casting integrally formed with a plurality of lens array regions each of which includes a plurality of lenses arranged in a line, the plurality of lens array regions being aligned with each other in a direction transverse to the line of the plurality of lenses; and
    forming slits simultaneously at sides of the lens array regions using a multiple-blade rotary cutter including a plurality of rotary blades regularly spaced from each other at a pitch corresponding to a dimension of each of the lens array regions in the transverse direction.

26. The process for making a lens array according to claim 25, wherein the step of forming slits is performed while cooling the resin casting.

27. The process for making a lens array according to claim 26, wherein the cooling of the resin casting is performed by supplying cooling water to a contact area between the multiple-blade rotary cutter and the resin casting and to an area adjacent to the contact area.

28. The process for making a lens array unit according to claim 25, wherein the forming of the slits includes:
 a first step of cutting the resin casting from a first surface of the resin casting with a plurality of first rotary blades to form a plurality of first grooves extending to an intermediate point of a thickness of the resin casting; and
 a second step, performed after the first step, for cutting the resin casting from a second surface opposite the first surface with a plurality of second rotary blades which are thicker than the first rotary blades to form a plurality of second grooves connected to the first grooves to provide the slits.

29. The process for making a lens array unit according to claim 28, wherein the first and the second steps are performed to satisfy the inequalities of $$t1>t/2,\ t2>(t-t1),\ t2<t/2$$

where t1 is a depth of each of the first grooves before the second step is performed,
 t2 being a depth of each of the second grooves, and
 t being a thickness of the resin casting at the sides of the plurality of lens array regions.

30. The process for making a lens array according to claim 25, wherein the resin casting is 0.8–2.0 mm in thickness, the multiple-blade rotary cutter being moved at a rate of 500–2,000 mm/min, each of the rotary blades being driven at a rotation speed of 2,000–6,000 rpm.

31. The process for making a lens array according to claim 25, wherein each of the rotary blades is 50–150 mm in diameter and has sawteeth the number of which is from 100 to 200.

32. A process for making a lens array comprising the steps of:
 preparing a resin casting integrally formed with a plurality of lens array regions each of which includes a plurality of lenses arranged in a line, the plurality of lens array regions being aligned with each other in a direction transverse to the line of the plurality of lenses; and
 forming slits at sides of the lens array regions;
 wherein the forming of the slits includes: a first step of cutting the resin casting from a first surface of the resin casting with a plurality of first rotary blades to form a plurality of first grooves extending to an intermediate point of a thickness of the resin casting; and a second step performed after the first step for cutting the resin casting from a second surface opposite the first surface with a plurality of second rotary blades which are thicker than the first rotary blades to form a plurality of second grooves connected to the first grooves to provide the slits.

33. The process for making a lens array unit according to claim 32, wherein the first and the second steps are performed to satisfy the inequalities of $$t1>t/2,\ t2>(t-t1),\ t2<t/2$$

where t1 is a depth of each of the first grooves before the second step is performed,
 t2 being a depth of each of the second grooves, and t being a thickness of the resin casting at the sides of the plurality of lens array regions.

* * * * *